United States Patent
Beck et al.

(10) Patent No.: US 10,427,515 B2
(45) Date of Patent: Oct. 1, 2019

(54) TRANSMISSION FOR A MOTOR VEHICLE, AND DRIVE TRAIN FOR A MOTOR VEHICLE

(71) Applicant: ZF Friedrichshafen AG, Friedrichshafen (DE)

(72) Inventors: Stefan Beck, Eriskirch (DE); Matthias Horn, Tetttnang (DE); Martin Brehmer, Tettnang (DE); Johannes Kaltenbach, Friedrichshafen (DE); Julian King, Rankweil (AT); Jens Moraw, Friedrichshafen (DE); Eckehard Münch, Bünde (DE); Gerhard Niederbrucker, Fiedrichshafen (DE); Juri Pawlakowitsch, Kressbronn (DE); Stephan Scharr, Friedrichshafen (DE); Viktor Warth, Friedrichshafen (DE); Michael Wechs, Weißensberg (DE); Peter Ziemer, Tettnang (DE); Uwe Griesmeier, Markdorf (DE); Raffael Kuberczyk, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 19 days.

(21) Appl. No.: 15/765,083

(22) PCT Filed: Sep. 27, 2016

(86) PCT No.: PCT/EP2016/072893
§ 371 (c)(1),
(2) Date: Mar. 30, 2018

(87) PCT Pub. No.: WO2017/055233
PCT Pub. Date: Apr. 6, 2017

(65) Prior Publication Data
US 2018/0297464 A1    Oct. 18, 2018

(30) Foreign Application Priority Data
Oct. 1, 2015 (EP) .................................. 15187818

(51) Int. Cl.
*F16H 3/66* (2006.01)
*B60K 6/365* (2007.10)
(Continued)

(52) U.S. Cl.
CPC ............... *B60K 6/365* (2013.01); *B60K 6/48* (2013.01); *B60K 6/547* (2013.01); *F16H 3/66* (2013.01);
(Continued)

(58) Field of Classification Search
None
See application file for complete search history.

(56) References Cited

U.S. PATENT DOCUMENTS

2008/0207380 A1*   8/2008   Raghavan ............... F16H 3/66
                                                                      475/275
2009/0017967 A1*   1/2009   Phillips .................... F16H 3/66
                                                                       475/275
(Continued)

FOREIGN PATENT DOCUMENTS

DE      102008033470 A1      5/2009
JP          S5013767 A      2/1975

OTHER PUBLICATIONS

International Search Report (English Translation) PCT/EP2016/072893, dated Dec. 8, 2016. (2 pages).

*Primary Examiner* — Justin Holmes
(74) *Attorney, Agent, or Firm* — Dority & Manning, P.A.

(57) ABSTRACT

A transmission (G) for a motor vehicle having an input shaft (GW1), an output shaft (GW2), three planetary gear sets, and six shift elements. By engaging the second shift element (06), the second element (E21) of the first planetary gear set
(Continued)

(P1) is rotationally fixable. By engaging the third shift element (07), the first element (E11) of the first planetary gear set (P1) is rotationally fixable. By engaging the fourth shift element (14), the input shaft (GW1) is connectable to the second element (E22) of the second planetary gear set (P2). By engaging the fifth shift element (15), the input shaft (GW1) is connectable to the first element (E12) of the second planetary gear set (P2). By engaging the sixth shift element (57), the first element (E12) of the second planetary gear set (P2) is connectable to the first element (E11) of the first planetary gear set (P1).

15 Claims, 28 Drawing Sheets

(51) Int. Cl.
B60K 6/48 (2007.10)
B60K 6/547 (2007.10)
F16H 3/72 (2006.01)
F16H 3/44 (2006.01)

(52) U.S. Cl.
CPC ............. *F16H 3/666* (2013.01); *F16H 3/724* (2013.01); *B60K 2006/4825* (2013.01); *B60Y 2200/92* (2013.01); *F16H 2003/445* (2013.01); *F16H 2200/006* (2013.01); *F16H 2200/0056* (2013.01); *F16H 2200/0086* (2013.01); *F16H 2200/0091* (2013.01); *F16H 2200/201* (2013.01); *F16H 2200/2043* (2013.01); *F16H 2200/2046* (2013.01); *F16H 2200/2048* (2013.01); *F16H 2200/2064* (2013.01); *F16H 2200/2094* (2013.01); *F16H 2200/2097* (2013.01)

(56) References Cited

U.S. PATENT DOCUMENTS

| | | | |
|---|---|---|---|
| 2009/0023534 A1 | 1/2009 | Wittkopp et al. | |
| 2012/0149526 A1* | 6/2012 | Gumpoltsberger | F16H 3/66 475/276 |
| 2017/0074364 A1* | 3/2017 | Kwon | F16H 3/66 |
| 2017/0268619 A1* | 9/2017 | Kook | F16H 3/66 |
| 2018/0363731 A1* | 12/2018 | Kook | F16H 3/66 |

* cited by examiner

| R1 | 03 | 06 | 07 | 14 | 15 | 57 |
|---|---|---|---|---|---|---|
| 1 | X | X |  |  | X | X |
| 2 | X | X | X |  | X |  |
| 3 | X |  |  |  | X |  |
| 4.1 | X |  |  | X | X | X |
| 4.2 | X | X |  | X |  |  |
| 4.3 | X |  | X | X |  |  |
| 4.4 | X |  |  | X |  |  |
| 5 |  |  |  | X | X | X |
| 6 |  |  | X | X | X | X |
| 7 |  |  | X | X |  | X |

Fig. 10

| | 03 | 06 | 07 | 14 | 15 | 47 | 57 |
|---|---|---|---|---|---|---|---|
| R3 | | | X | | X | X | |
| R1 | | X | | | X | | X |
| R2 | | X | X | | X | X | |
| 1b | X | X | | | X | | |
| 2b | X | | X | | X | | X |
| 3b | X | | | | X | X | |
| 4b | X | | | | X | | |
| 5.1b | X | X | | X | X | | X |
| 5.2b | X | | X | X | | | |
| 5.3b | X | | | X | | | |
| 5.4b | X | | | X | X | | |
| 5.5b | X | | | X | X | X | |
| 6.1b | | | | X | | | X |
| 6.2b | | | | X | X | X | |
| 6.3b | | | | X | | X | X |
| 6.4b | | | | | X | X | X |
| 7b | | | X | X | X | | |
| 8b | | | X | X | | | X |

Fig. 12

| | R1 | 1b | 2b | 3b | 4b | 5.1b | 5.2b | 5.3b | 5.4b | 5.5b | 6.1b | 6.2b | 6.3b | 6.4b | 7b | 8b |
|---|---|---|---|---|---|---|---|---|---|---|---|---|---|---|---|---|
| 03 |   | X | X | X | X | X | X | X | X | X |   |   |   |   |   |   |
| 06 | X | X |   |   |   | X |   |   |   |   |   |   |   |   |   |   |
| 07 |   |   | X |   |   |   | X |   |   |   |   |   |   | X | X |   |
| 14 |   |   |   |   |   | X | X | X | X | X | X | X |   | X | X | X |
| 15 |   | X | X | X | X | X | X |   |   | X | X |   | X | X |   |   |
| 57 | X |   |   | X |   |   |   | X |   |   | X | X | X |   |   | X |
| 67 |   |   |   | X |   |   |   |   |   | X | X |   | X | X |   |   |

Fig. 15

|      | 03 | 06 | 07 | 14 | 15 | 57 |
|------|----|----|----|----|----|----|
| R1   |    |    |    |    |    | X  |
| 1    | X  | X  |    |    | X  |    |
| 2    | X  | X  | X  |    | X  |    |
| 3    | X  |    |    |    | X  | X  |
| 4.1  | X  |    |    | X  | X  |    |
| 4.2  | X  | X  | X  | X  |    |    |
| 4.3  | X  |    |    | X  |    | X  |
| 4.4  | X  |    |    | X  |    | X  |
| 5    |    |    | X  | X  | X  | X  |
| 6    |    |    | X  | X  | X  |    |
| 7    |    |    |    | X  |    | X  |
| ER   |    | X  |    |    |    | X  |
| E1   | X  | X  | X  |    |    |    |
| E2   | X  |    |    |    |    |    |
| E3   | X  |    |    |    |    | X  |
| EDA1 |    |    |    | X  |    | X  |
| EDA2 |    |    | X  | X  |    |    |

| | 03 | 06 | 07 | 14 | 15 | 47 | 57 |
|---|---|---|---|---|---|---|---|
| R3 | | | | | X | X | |
| R1 | | X | X | | X | | X |
| R2 | | X | | | X | X | |
| 1b | X | X | | | X | | |
| 2b | X | | X | | X | X | |
| 3b | X | | | | X | | X |
| 4b | X | X | | | X | | |
| 5.1b | X | X | | X | X | | |
| 5.2b | X | | | X | | | |
| 5.3b | X | | | X | | | X |
| 5.4b | X | | | X | | X | |
| 5.5b | X | | | X | | | |
| 6.1b | | | | X | X | X | X |
| 6.2b | | | | X | X | X | X |
| 6.3b | | | | | X | X | X |
| 6.4b | | | X | X | X | X | X |
| 7b | | | X | X | X | X | |
| 8b | | | X | | | | X |

Fig. 23

| | 03 | 06 | 07 | 14 | 15 | 47 | 57 |
|---|---|---|---|---|---|---|---|
| ER3 | | | X | | | X | |
| ER | | X | | | | | X |
| ER2 | X | X | | | | | X |
| E1b | X | X | | | | X | |
| E2b | X | | X | | | | |
| E3b | X | | | | | X | X |
| E4b | | | | | | X | X |
| E5b | | | X | | | X | X |
| EDA1 | | | | X | | | |
| EDA2 | | | | X | | | |

Fig. 28

| | 03 | 06 | 07 | 14 | 15 | 57 | 67 |
|---|---|---|---|---|---|---|---|
| R1 | X | | | | X | X | |
| 1b | X | X | | | X | | |
| 2b | X | | X | | X | | |
| 3b | X | | | | X | | |
| 4b | X | | | | X | X | X |
| 5.1b | X | X | | | X | | |
| 5.2b | X | | | | X | | |
| 5.3b | X | | X | X | | | |
| 5.4b | X | | | X | | | |
| 5.5b | X | | | X | | X | |
| 6.1b | | | | X | | X | X |
| 6.2b | | | | X | X | X | |
| 6.3b | | | | X | X | | X |
| 6.4b | | | | X | X | X | X |
| 7b | | | X | X | | | |
| 8b | | | X | X | | X | |

Fig. 29

| | 03 | 06 | 07 | 14 | 15 | 57 | 67 |
|---|---|---|---|---|---|---|---|
| ER | | X | | | | X | |
| E1b | X | X | | | | | |
| E2b | X | | X | | | | |
| E3b | X | | | | | | X |
| E4b | X | | | | | | |
| E5b | | | | | | | X |
| EDA1 | | | X | X | | X | |
| EDA2 | | | | X | | X | |
| EDA3 | | | | X | | | X |

TRANSMISSION FOR A MOTOR VEHICLE, AND DRIVE TRAIN FOR A MOTOR VEHICLE

FIELD OF THE INVENTION

The invention relates generally to a transmission for a motor vehicle, and to a drive train for a motor vehicle including such a transmission. In this case, a transmission means, in particular, a multi-stage transmission, in which a multitude of gears, i.e., fixed translation ratios between the input shaft and the output shaft of the transmission, are preferably automatically shiftable by shift elements. In this case, the shift elements are clutches or brakes, for example. Such transmissions are utilized primarily in motor vehicles in order to adapt the rotational speed and torque output characteristic of the drive unit to the driving resistances of the vehicle in a suitable way.

BACKGROUND

Patent application DE 199 12 480 A1, which belongs to the applicant, describes an automatic transmission for motor vehicles including three single-carrier planetary gear sets, three brakes, and two clutches for shifting between six forward gears and one reverse gear, and an input shaft and an output shaft. The input shaft is directly connected to the sun gear of the second planetary gear set, and is connectable to the sun gear of the first planetary gear set via the first clutch and to the carrier of the first planetary gear set via the second clutch. The sun gear of the first planetary gear set is connectable to the housing via the first brake, the carrier of the first planetary gear set is connectable to the housing via the second brake, and the sun gear of the third planetary gear set is connectable to the housing via the third brake. The carrier of the first planetary gear set is connected to the ring gear of the second planetary gear set. The carrier of the second planetary gear set is connected to the ring gear of the third planetary gear set. The ring gear of the first planetary gear set is connected to the carrier of the third planetary gear set and to the output shaft. In addition, one-way clutches are usable at every point of the transmission, for example between a shaft and the housing.

Patent application DE 101 62 873 A1, which belongs to the applicant, shows a multi-stage transmission in planetary design in FIG. 3, the design of which is very similar to that of the above-described transmission. The direct connection between the input shaft and the sun gear of the second planetary gear set is replaced by a shiftable connection, in that an additional clutch is made available.

SUMMARY OF THE INVENTION

Therefore, the object of the invention is to provide an improved transmission having at least seven forward gears available.

The transmission according to the invention includes an input shaft, an output shaft, three planetary gear sets, and six shift elements. One planetary gear set includes a sun gear, a carrier, and a ring gear. Rotatably mounted on the carrier are planetary gears which intermesh with the tooth system of the sun gear and/or with the tooth system of the ring gear. A minus gear set refers to a planetary gear set including a carrier, on which the planetary gears are rotatably mounted, and including a sun gear and a ring gear, wherein the tooth system of at least one of the planetary gears intermeshes both with the tooth system of the sun gear and with the tooth system of the ring gear, whereby the ring gear and the sun gear rotate in opposite directions of rotation when the sun gear rotates while the carrier is held. A plus gear set differs from the above-described minus planetary gear set in that the plus gear set includes inner and outer planetary gears which are rotatably mounted on the carrier. The tooth system of the inner planetary gears intermeshes, in this case, with the tooth system of the sun gear and with the tooth system of the outer planetary gears. In addition, the tooth system of the outer planetary gears intermeshes with the tooth system of the ring gear. As a result, the ring gear and the sun gear rotate in the same direction of rotation when the carrier is held.

Each of the three planetary gear sets includes a first, a second, and a third element. The first element is always the sun gear of the respective planetary gear set. As a minus gear set, the second element is the carrier of the respective planetary gear set, and the third element is the ring gear of the respective planetary gear set. As a plus gear set, the second element is the ring gear of the respective planetary gear set, and the third element is the carrier of the respective planetary gear set. In the present transmission, the second planetary gear set is particularly suitable for being a minus or plus gear set. If a minus gear set is replaced by a plus gear set, in addition to changing the connection of the elements "carrier" and "ring gear", the absolute value of the stationary transmission ratio must be increased by the value "one" in order to achieve the same transmission effect.

The output shaft is permanently connected to the third element of the first planetary gear set and to the second element of the third planetary gear set. The second element of the first planetary gear set is permanently connected to the third element of the third planetary gear set.

The transmission includes a first coupling and a second coupling. The first coupling exists between the first element of the third planetary gear set and a rotationally fixed component of the transmission, for example the transmission housing. The second coupling exists between the second element of the second planetary gear set and the third element of the third planetary gear set. One of the two couplings is a permanent, rotationally fixed connection, while the other of the two couplings is a connection which is shiftable by the first shift element. By engaging the first shift element, a torque transmission between the elements of the third planetary gear set is therefore made possible.

By engaging the second shift element, the second element of the first planetary gear set is rotationally fixable. By engaging the third shift element, the first element of the first planetary gear set is rotationally fixable. By engaging the fourth shift element, the input shaft is connectable to the second element of the second planetary gear set. By engaging the fifth shift element, the input shaft is connectable to the first element of the second planetary gear set. By engaging the sixth shift element, the first element of the second planetary gear set is connectable to the first element of the first planetary gear set.

A transmission having this assignment of the individual transmission elements, according to the invention, makes it possible to provide seven forward gears, which are described in detail in the following. In addition, such a transmission has a compact design, low component loads, and good gearing efficiency.

Through selective engagement of three of the six shift elements, seven forward gears are providable between the input shaft and the output shaft. The first forward gear is formed by engaging the first shift element, the second shift element, and the fifth shift element. The second forward gear is formed by engaging the first shift element, the third shift element, and the fifth shift element. The third forward gear is formed by engaging the first shift element, the fifth shift element, and the sixth shift element. The fourth forward gear is formed by engaging the first shift element, the fourth shift element, and yet another of the six shift elements, i.e., the second, third, fifth, or sixth shift element. Thus, there are four possibilities for forming the fourth forward gear. By engaging the first and the fourth shift elements, the speed ratio between the input shaft and the output shaft is already defined. By engaging yet another shift element, the speed ratios of the elements of the first and the second planetary gear sets are also established. The fifth forward gear is formed by engaging the fourth shift element, the fifth shift element, and the sixth shift element. The sixth forward gear is formed by engaging the third shift element, the fourth shift element, and the fifth shift element. The seventh forward gear is formed by engaging the third shift element, the fourth shift element, and the sixth shift element. As a result, given a suitable selection of the stationary transmission ratios of the planetary gear sets, a transmission ratio range which is well suited for the application in a motor vehicle is achieved. In addition, two adjacent forward gears always include two shift elements which are engaged in both of these gears. This simplifies the gear change operation and shortens the shifting duration between adjacent forward gears. Since the first shift element and the fifth shift element are engaged at least in the first to third forward gears, the shift pattern enables a gear shift between each of the first three forward gears, which has been simplified in this manner. Of the four possibilities for forming the fourth forward gear, that variant is preferred, in which the fifth shift element contributes to the formation of the fourth forward gear. As a result, the fifth shift element can remain engaged in a gear shift between the third and the fourth forward gears and in a gear shift between the fourth and the fifth forward gears.

In principle, each of the six shift elements can be a form-fit or positive-locking shift element, i.e., for example a dog clutch, or a friction-locking shift element, i.e., for example a multi-disk clutch. Preferably, the second shift element and/or the fifth shift element are form-fit shift elements. Form-fit shift elements, in the engaged state, establish the connection via positive engagement and, in the disengaged state, are distinguished by lower drag losses than friction-locking shift elements. Due to the low drag losses in the disengaged state, the efficiency of the transmission is improved, in particular since the second shift element must be engaged only in the first of the seven forward gears, provided it does not contribute to the formation of the fourth forward gear. When the transmission is utilized in the drive train of a motor vehicle, the second shift element is therefore mainly disengaged. The mechanical efficiency of the motor vehicle drive train can therefore be improved by such a transmission. According to one alternative embodiment, the second and/or the fifth shift elements can also be friction-locking shift elements, for example steel-steel elements, in which the friction faces assigned to each other have a high friction coefficient. The second and/or the fifth shift element can also be band brakes.

According to a first embodiment, external interfaces of the input shaft and of the output shaft are arranged coaxially to each other and at opposite axial ends of the transmission. Of the three planetary gear sets, the third planetary gear set has the greatest axial separation from the external interface of the input shaft. Such an arrangement is particularly suitable for the application of the transmission in a motor vehicle including a drive train aligned in parallel to the direction of travel of the motor vehicle.

According to a second embodiment, external interfaces of the input shaft and the output shaft are arranged coaxially to each other, wherein, in this case, the third planetary gear set of the three planetary gear sets has the shortest axial separation from the external interface of the input shaft. The external interface of the output shaft includes a tooth system in this case, which intermeshes with a tooth system of a shaft arranged axially parallel to the main axis of the transmission. The axle differential of a drive train can be arranged on this shaft, for example. Such an arrangement is particularly suitable for the application of the transmission in a motor vehicle including a drive train aligned transversely to the direction of travel of the motor vehicle.

According to one possible embodiment, the transmission includes a seventh shift element. The seventh shift element can be arranged at two different operative connections: by engaging the seventh shift element, the first element of the first planetary gear set is connectable either to the second element of the second planetary gear set or to the second element of the first planetary gear set. Through the seventh shift element, eight forward gears are shiftable between the input shaft and the output shaft, as explained in detail in the following.

Through selective engagement of three of the seven shift elements, eight forward gears are providable between the input shaft and the output shaft. The first forward gear is formed by engaging the first shift element, the second shift element, and the fifth shift element. The second forward gear is formed by engaging the first shift element, the third shift element, and the fifth shift element. The third forward gear is formed by engaging the first shift element, the fifth shift element, and the seventh shift element. The fourth forward gear is now formed by engaging the first shift element, the fifth shift element, and the sixth shift element. The fifth forward gear is formed by engaging the first shift element, the fourth shift element, and yet another of the seven shift elements, i.e., the second, third, fifth, sixth, or seventh shift element. Thus, there are five possibilities for forming the fourth forward gear. By engaging the first and the fourth shift elements, the speed ratio between the input shaft and the output shaft is already defined. By engaging yet another shift element, the speed ratios of the elements of the first and the second planetary gear sets are also established. The sixth forward gear is now formed by engaging three of the fourth to seventh shift elements. In the sixth forward gear, the three planetary gear sets are interlocked, and therefore the elements of the three planetary gear sets have the same speed. This is achievable by engaging three of the following shift elements: fourth, fifth, sixth, and seventh shift element. The seventh forward gear is formed by engaging the third shift element, the fourth shift element, and the fifth shift element. The eighth forward gear is formed by engaging the third shift element, the fourth shift element, and the sixth shift element. Of the four variants for forming the sixth forward gear, that variant is preferred, in which the fourth, fifth, and sixth shift elements are engaged. This facilitates the gear shift between the fifth and sixth forward gears, and between the sixth and seventh forward gears.

Preferably, one reverse gear is formed between the input shaft and the output shaft by engaging the second shift element, the fifth shift element, and the sixth shift element. Since the second and the fifth shift elements are also engaged in the first forward gear, a shift operation between a first forward gear and a reverse gear can be particularly easily formed.

If the first element of the first planetary gear set is connected to the second element of the second planetary gear set by engaging the seventh shift element, a second and/or third reverse gear between the input shaft and the output shaft are/is available as an alternative or in addition to the reverse gear. The second reverse gear is formed, in this case, by engaging the second, fifth, and seventh shift elements. The third reverse gear is formed by engaging the third, the fifth, and the seventh shift elements.

Preferably, the transmission includes an electric machine or motor including a rotationally fixed stator and a rotary rotor. In this case, the rotor is permanently connected either to the input shaft or to the first element of the second planetary gear set. The permanent connection can be, in this case, a direct connection or a fixed transmission ratio, for example via an additional planetary gear set, wherein one element of this planetary gear set is rotationally fixed. For example, its sun gear could be permanently rotationally fixed, its carrier should be connected to the input shaft or to the first element of the second planetary gear set, and its ring gear could be connected to the rotor of the electric machine, and therefore the speed of the rotor is increased as compared to the connecting element. The functionality of the transmission is expandable by the electric machine, whereby the transmission is suitable for the drive train of a hybrid vehicle. The connection of the rotor to the input shaft allows for the use of all forward gears when the hybrid vehicle is driven by the electric machine. The connection of the rotor to the first element of the second planetary gear set allows for, inter alia, a continuously variable operation of the transmission.

The transmission can include a connecting shaft which acts as an interface to a transmission-external drive unit, for example an internal combustion engine. The connecting shaft is connectable to the input shaft via a separating clutch. Alternatively thereto, the separating clutch, including the connecting shaft, can also be arranged outside the transmission. The separating clutch, as an integral part the transmission, is preferably arranged radially within the electric machine, particularly preferably within the rotor. As a result, a compact design of the transmission is facilitated. By disengaging the separating clutch, the motor vehicle is drivable by the electric machine in all forward gears of the transmission without entraining the transmission-external drive. The separating clutch can be a form-fit or friction-locking shift element.

If the rotor is connected to the first element of the second planetary gear set, in an embodiment of the transmission including six shift elements, it is possible to form three electrically drivable forward gears between the first element of the second planetary gear set and the output shaft. In this case, two of the six shift elements are engaged in each of the three electrically drivable forward gears. The first electrically drivable forward gear is formed by engaging the first shift element and the second shift element. The second electrically drivable forward gear is formed by engaging the first shift element and the third shift element. The third electrically drivable forward gear is formed by engaging the first shift element and the sixth shift element. In a gear shift between the three electrically drivable forward gears, only one shift element must be disengaged and one shift element must be engaged in each case, since the first shift element is engaged in all three electrically drivable forward gears. This facilitates the gear shift between the three electrically drivable forward gears. In all three electrically drivable forward gears, the fourth and the fifth shift elements are disengaged, whereby no torque is transmitted to the input shaft. The separating clutch between the input shaft and the transmission-external drive unit can therefore be omitted.

In addition, the formation of an electrically drivable reverse gear between the first element of the second planetary gear set and the output shaft is also possible, in that the second shift element and the sixth shift element are engaged. In principle, a reverse rotation of the output shaft could also take place by the electric machine connected to the first element of the second planetary gear set, in that one of the three electrically drivable forward gears is selected and the rotor is driven counter to a preferred direction of rotation. If the supply of hydraulic fluid to the transmission—for example for actuating selected shift elements and/or for lubrication—takes place by a hydraulic fluid pump driven by a transmission shaft, this pump would also have to be capable of making hydraulic fluid available for reverse rotation. By forming the electrically drivable reverse gear, the pump can be arranged in such a way that the pump is always operated in one defined direction of rotation. Preferably, the pump is connected to the shaft that is connected to the first element of the second planetary gear set.

If the motor vehicle is to switch from an electric mode into an internal combustion engine-operated mode or a hybrid mode, a change from each of the three electrically drivable gears into a suitable forward or reverse gear can be carried out by engaging the fifth shift element. By engaging the fifth shift element, a change from the electrically drivable reverse gear into the actual reverse gear takes place. By engaging the fifth shift element, a change from the first electrically drivable forward gear into the first forward gear takes place. By engaging the fifth shift element, a change from the second electrically drivable forward gear into the second forward gear takes place. By engaging the fifth shift element, a change from the third electrically drivable forward gear into the third forward gear takes place. By engaging the fourth shift element, a shift into the fourth forward gear proceeding from the first, the second, or the third electrical drivable forward gear can also take place.

If the rotor is connected to the first element of the second planetary gear set and the transmission also includes the seventh shift element, it is possible to form at least five electrically drivable forward gears between the first element of the second planetary gear set and the output shaft. In this case, two of the six shift elements are engaged in each of the five electrically drivable forward gears. The first electrically drivable forward gear is formed by engaging the first shift element and the second shift element. The second electrically drivable forward gear is formed by engaging the first shift element and the third shift element. The third electrically drivable forward gear is formed by engaging the first shift element and the seventh shift element. The fourth electrically drivable forward gear is formed by engaging the first shift element and the sixth shift element. The fifth electrically drivable forward gear is formed by engaging the sixth shift element and the seventh shift element. Due to these two additional electrically drivable forward gears, the transition from electric motor-operated driving to internal combustion engine-operated driving at high vehicle speeds is improved, since a direct gear shift from the fifth electrically drivable forward gear into the sixth of eight forward gears is possible by engaging the fourth or the fifth shift element.

If the first element of the first planetary gear set is connected to the second element of the second planetary gear set by engaging the seventh shift element, and if the rotor is connected to the first element of the second planetary gear set, it is possible to form two further electrically drivable reverse gears between the first element of the second planetary gear set and the output shaft. To this end, the seventh shift element as well as the second or the third shift element must be engaged. The two further electrically drivable reverse gears can supplement or replace the above-described electrically drivable reverse gear.

If the rotor is connected to the first element of the second planetary gear set, it is possible to form at least one superimposed operating mode. The superimposed operating mode results, in this case, by engaging the fourth shift element and by engaging the sixth or the third shift element. The remaining shift elements are disengaged in this case. By engaging the fourth shift element, the input shaft is connected to the second element of the second planetary gear set, whereby a speed predefined at the output shaft is present at this element. The speed of the first element of the second planetary gear set can be established by predefining the rotor speed. As a result, the speed of the third element of the second planetary gear set is established and is infinitely variable. By engaging the sixth or the third shift element, the power present at the third element of the second planetary gear set is transmitted to the output shaft. As a result, for example, the output speed can be steplessly changed at a predefined speed of the input shaft and a specification of the rotor speed. When the transmission is utilized in the drive train of a motor vehicle, it is therefore also possible to form a starting process without holding a shift element of the transmission, as the starting component, in slip operation. If the first element of the first planetary gear set is connected to the second element of the second planetary gear set by engaging the seventh shift element, yet another possibility for forming such a superimposed operating mode results by engaging the fourth shift element and the seventh shift element.

In principle, a starting component is installable upstream from the transmission in a known way, for example a hydrodynamic torque converter or a friction clutch. Such a starting component can also be an integral part of the transmission. The starting component allows for a starting process when the transmission is utilized in the drive train of a motor vehicle, in that the starting component allows for slip between the internal combustion engine and the output shaft. Preferably, such a starting component is formed within the transmission, however, in that the first shift element is designed as a friction shift element. Due to a slip operation of the first shift element, a starting process is possible in all low forward gears. For a starting process in the reverse gear, the sixth shift element is designed as a friction shift element. Therefore, a separate starting component can be omitted. If the fifth shift element is designed as a friction-locking friction shift element, the fifth shift element can act as a starting component both for starting in the forward direction and for starting in the reverse direction.

The transmission can be an integral part of a drive train of a motor vehicle. The drive train includes an internal combustion engine in addition to the transmission, which is flexibly connected to the input shaft of the transmission via a torsional vibration damper. The separating clutch, which can be an integral part of the transmission, can be located between the input shaft and the internal combustion engine. The output shaft of the transmission is operatively connected, in a driving manner, to an axle transmission which is connected to wheels of the motor vehicle. If the transmission includes the electric machine, the drive train allows for multiple drive modes of the motor vehicle. In an electric mode, the motor vehicle is driven by the electric machine of the transmission. In an internal combustion engine-operated mode, the motor vehicle is driven by the internal combustion engine. In a hybrid mode, the motor vehicle is driven by both the internal combustion engine and by the electric machine of the transmission.

A permanent connection is referred to as a connection that always exists between two elements. Elements that are permanently connected in such a way always rotate with the same dependence between their speeds. There can be no shift element located in a permanent connection between two elements. A permanent connection is therefore to be distinguished from a shiftable connection. A permanently rotationally fixed connection is referred to as a connection that always exists between two elements and, therefore, the connected elements in the connection always have the same rotational speed.

The expression "engage a shift element" in the context of gear formation is understood to mean an operation in which the shift element is controlled in such a way that the shift element transmits a high amount of torque at the end of the engagement operation. While form-fit shift elements do not permit a speed differential in the "engaged" state, in the case of friction-locking shift elements in the "engaged" state, a low speed differential can form between the shift-element halves, either intentionally or not.

BRIEF DESCRIPTION OF THE DRAWINGS

Exemplary embodiments of the invention are described in detail in the following with reference to the attached figures. Components that are the same or similar are labeled using the same reference characters. In the drawings, the following is shown:

FIG. 10 shows a shift pattern for the transmission according to the first to ninth exemplary embodiments;

FIG. 12 shows a shift pattern for the transmission according to the tenth exemplary embodiment;

FIG. 15 shows a shift pattern for the transmission according to the eleventh and twelfth exemplary embodiments;

FIG. 16 to FIG. 21 each show a schematic representation of a transmission including an electric machine according to the thirteenth to seventeenth exemplary embodiments of the invention;

FIG. 22 and FIG. 23 show a shift pattern for the transmission according to the seventeenth exemplary embodiment;

FIG. 28 and FIG. 29 show a shift pattern for the transmission according to the twentieth and the twenty-first exemplary embodiments.

DETAILED DESCRIPTION

Figure 1:
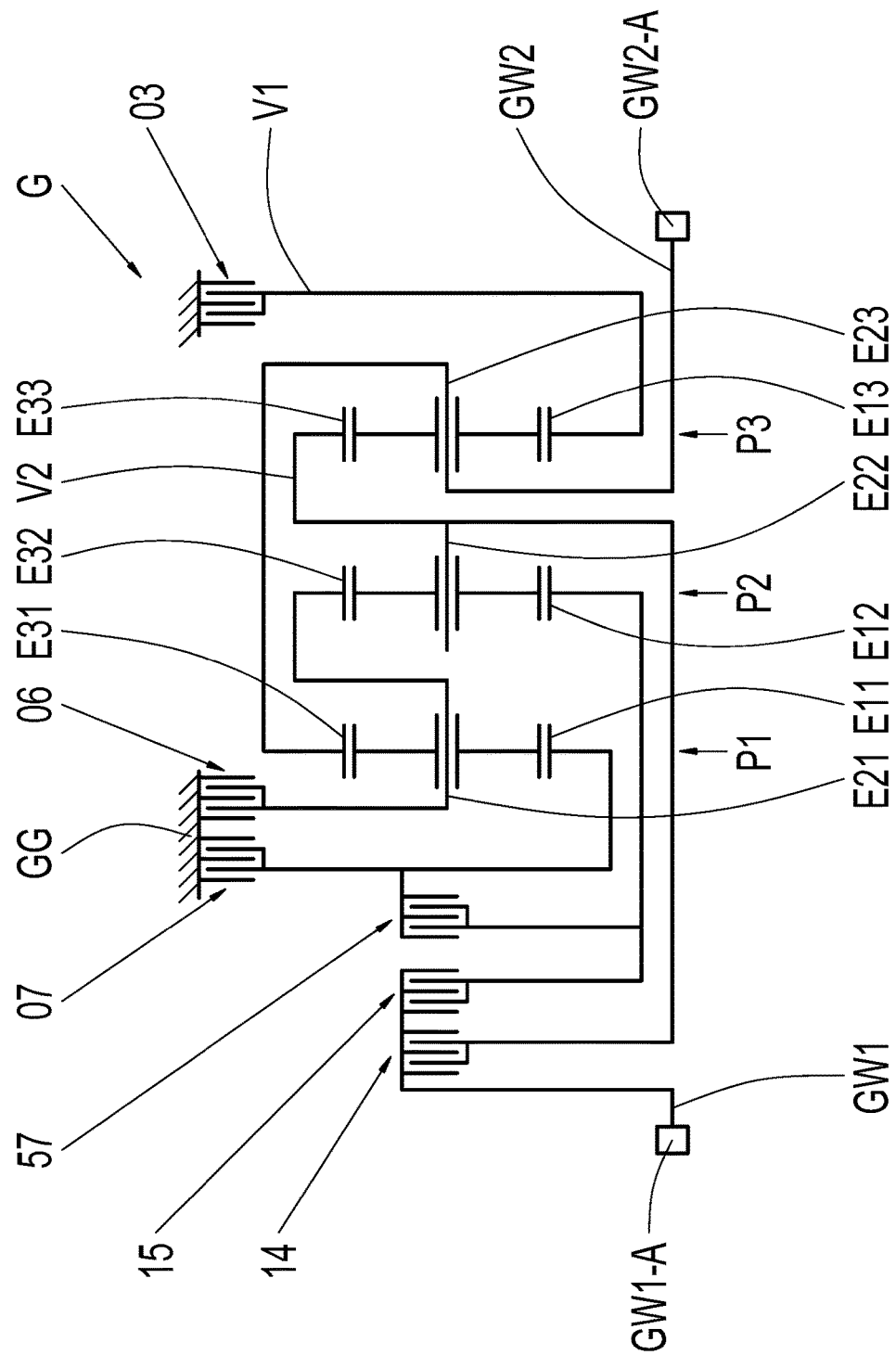
FIG. 1 to FIG. 9 each show a schematic representation of a transmission according to the first to ninth exemplary embodiments of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically shows a transmission G according to a first exemplary embodiment of the invention. The transmission G includes a first planetary gear set P1, a second planetary gear set P2, and a third planetary gear set P3. Each of the three planetary gear sets P1, P2, P3 includes a first element E11, E12, E13, a second element E21, E22, E23, and a third element E31, E32, E33. The first element E11, E12, E13 is always a sun gear of the respective planetary gear set P1, P2, P3. If the planetary gear set is a minus gear set, the second element E21, E22, E23 is a carrier of the respective planetary gear set P1, P2, P3, and the third element E31, E32, E33 is a ring gear of the respective planetary gear set P1, P2, P3. In the embodiment of the transmission G represented in FIG. 1, the planetary gear sets P1, P2, P3 are minus gear sets.

The second element E21 of the first planetary gear set P1 is permanently connected to the third element E32 of the second planetary gear set P2. The second element E22 of the second planetary gear set P2 is permanently connected to the third element E33 of the third planetary gear set P3. The third element E31 of the first planetary gear set P1 is permanently connected to the second element E32 of the third planetary gear set P3. An output shaft GW2 is permanently connected to the second element E23 of the third planetary gear set P3.

The transmission G includes a first shift element 03, a second shift element 06, a third shift element 07, a fourth shift element 14, a fifth shift element 15, and a sixth shift element 57. By engaging the first shift element 03, the first element E13 of the third planetary gear set P3 is rotationally fixed. By engaging the second shift element 06, the second element E21 of the first planetary gear set P1 is rotationally fixed. By engaging the third shift element 07, the first element E11 of the first planetary gear set P1 is rotationally fixed. By engaging the fourth shift element 14, an input shaft GW1 is connected to the second element E22 of the second planetary gear set P2. By engaging the fifth shift element 15, the input shaft GW1 is connected to the first element E12 of the second planetary gear set P2. By engaging the sixth shift element 57, the first element E12 of the second planetary gear set P2 is connected to the first element E11 of the first planetary gear set P1.

The transmission G includes a multitude of couplings, including a first coupling V1 and a second coupling V2. The first coupling V1 exists between the first element E13 of the third planetary gear set P3 and a rotationally fixed component GG of the transmission G, for example the transmission housing. The second coupling V2 exists between the second element E22 of the second planetary gear set P2 and the third element E33 of the third planetary gear set P3. One of these two couplings V1, V2 is always a permanently rotationally fixed connection, namely the second coupling V2 in the specific exemplary embodiment. The other coupling, namely the first coupling V1 in the present exemplary embodiment, is a connection which is shiftable by the first shift element 03.

The planetary gear sets P1, P2, P3 are successively arranged in the following axial sequence: first planetary gear set P1, second planetary gear set P2, third planetary gear set P3. The three planetary gear sets P1, P2, P3 are arranged axially directly adjacently, and therefore none of the six shift elements 03, 06, 07, 14, 15, 57 is arranged between the three planetary gear sets P1, P2, P3. This yields an axially compact design. The six shift elements 03, 06, 07, 14, 15, 57 are easily accessible from the outside, thereby simplifying the actuation of these shift elements. External interfaces GW1-A, GW2-A of the input shaft GW1 and the output shaft GW2 are arranged coaxial to each other and at opposite ends of the transmission G. Therefore, the transmission G is suitable for the application in a motor vehicle drive train which is aligned in parallel to the direction of travel of the motor vehicle. Via the external interface GW1-A, the input shaft GW1 can be in connection with or is connectable to a transmission-external drive unit. A starting component, for example, a hydrodynamic torque converter or a friction clutch, can be located in this connection. Such a starting component can also be an integral part of the transmission G. Via the external interface GW2-A, the output shaft GW2 is connectable to an axle transmission AG (not shown) which can be part of the transmission G or can also be arranged external to the transmission.

The transmission G according to the first exemplary embodiment includes three shift elements 03, 06, 07, which are brakes, and three shift elements 14, 15, 57 are clutches. Having a high number of shift elements that are brakes simplifies the design of the transmission G, since brakes are easy to actuate due to their arrangement close to the housing. In the transmission G according to the first exemplary embodiment, the three shift elements 03, 06, 07 that are brakes are arranged axially outside the three planetary gear sets P1, P2, P3. Such an arrangement facilitates a radially compact design of the transmission G. Alternatively, the three shift elements 03, 06, 07 that are brakes can also be arranged radially outside the three planetary gear sets P1, P2, P3. Due to such an arrangement, an axially particularly compact transmission G is obtained.

Each of the six shift elements 03, 06, 07, 14, 15, 57 can be a form-fit shift element or as a friction-locking shift element. This applies for all exemplary embodiments. In the first exemplary embodiment represented in FIG. 1, all these shift elements are schematically represented as friction-locking shift elements. Proceeding from the external interface GW-1 of the input shaft GW1, the following shift elements are arranged essentially axially adjacently in the following sequence: fourth shift element 14, fifth shift element 15, sixth shift element 57, third shift element 07, second shift element 06. This arrangement is to be considered to be merely an example and is changeable as necessary. For example, the second shift element 06 can be arranged, at least in sections, radially within the third shift element 07, or vice versa. The fifth shift element 15 can be arranged radially outside the fourth shift element 14. The sixth shift element 57 can be arranged radially within the third shift element 07. A person skilled in the art will make an appropriate selection from the possible arrangements of the six shift elements depending on the external peripheral conditions.

Figure 2:
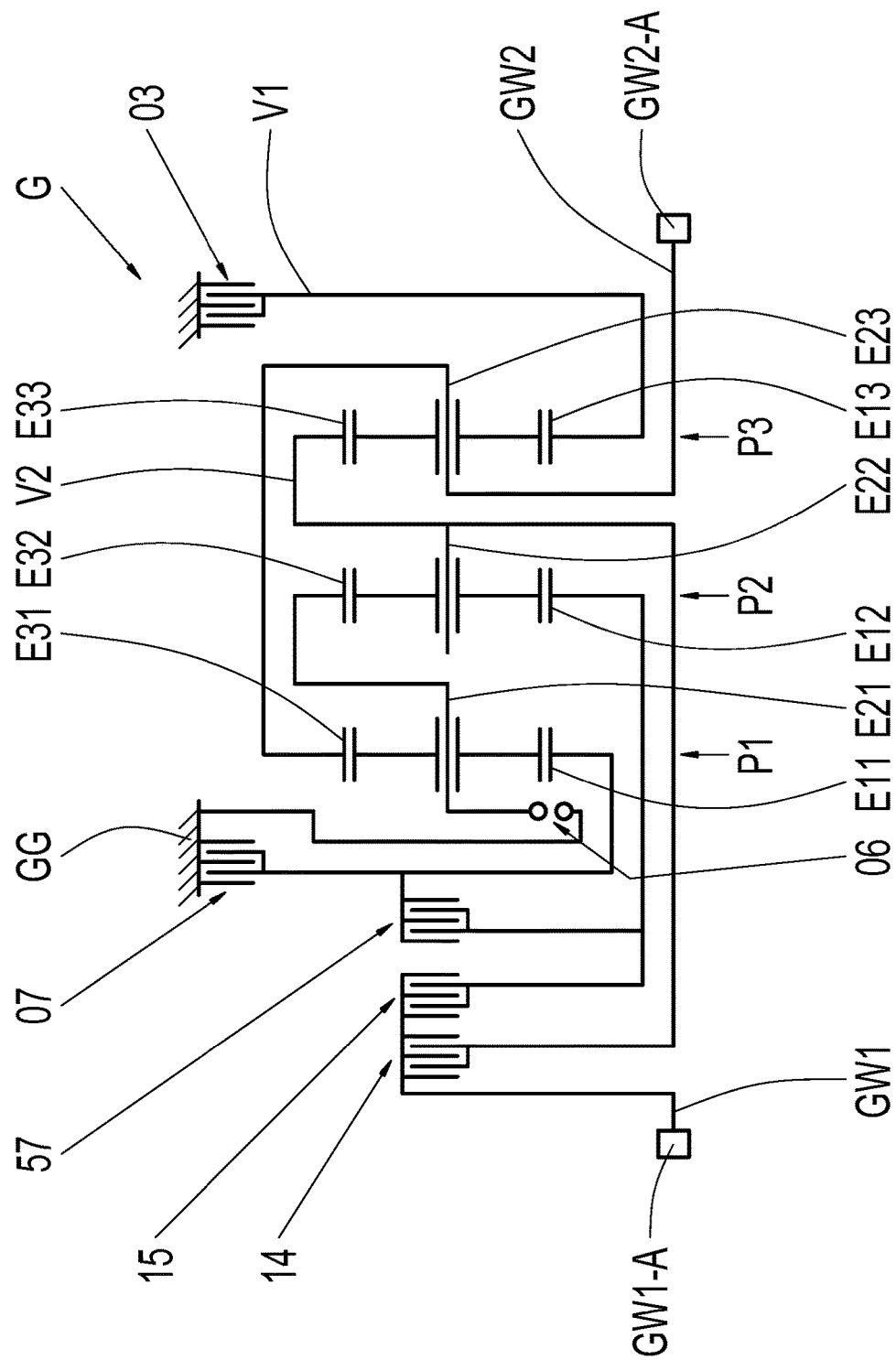

FIG. 2 schematically shows a transmission G according to a second exemplary embodiment of the invention, which essentially corresponds to the first exemplary embodiment represented in FIG. 1. Only the type and position of the second shift element 06 has been changed, in that the second shift element 06 is now a form-fit shift element which is now arranged radially close to the main axis of rotation of the transmission G. The remaining shift elements are still friction-locking shift elements.

Figure 3:
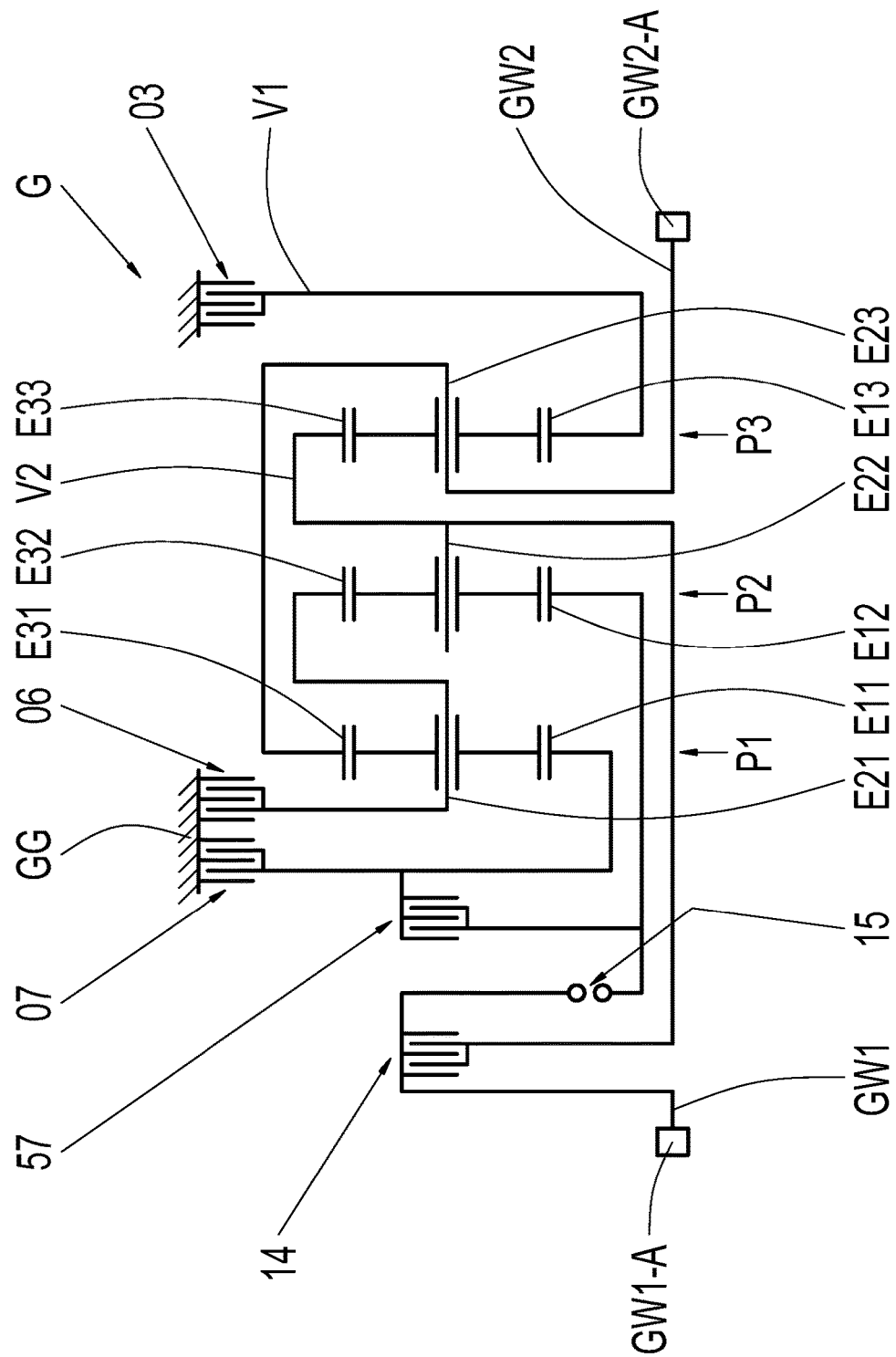

FIG. 3 schematically shows a transmission G according to a third exemplary embodiment of the invention, which essentially corresponds to the first exemplary embodiment represented in FIG. 1. Only the type and position of the fifth shift element 15 has been changed, and therefore the fifth shift element 15 is now a form-fit shift element which is arranged radially close to the main axis of rotation of the transmission G. The remaining shift elements are still friction-locking shift elements.

Figure 4:
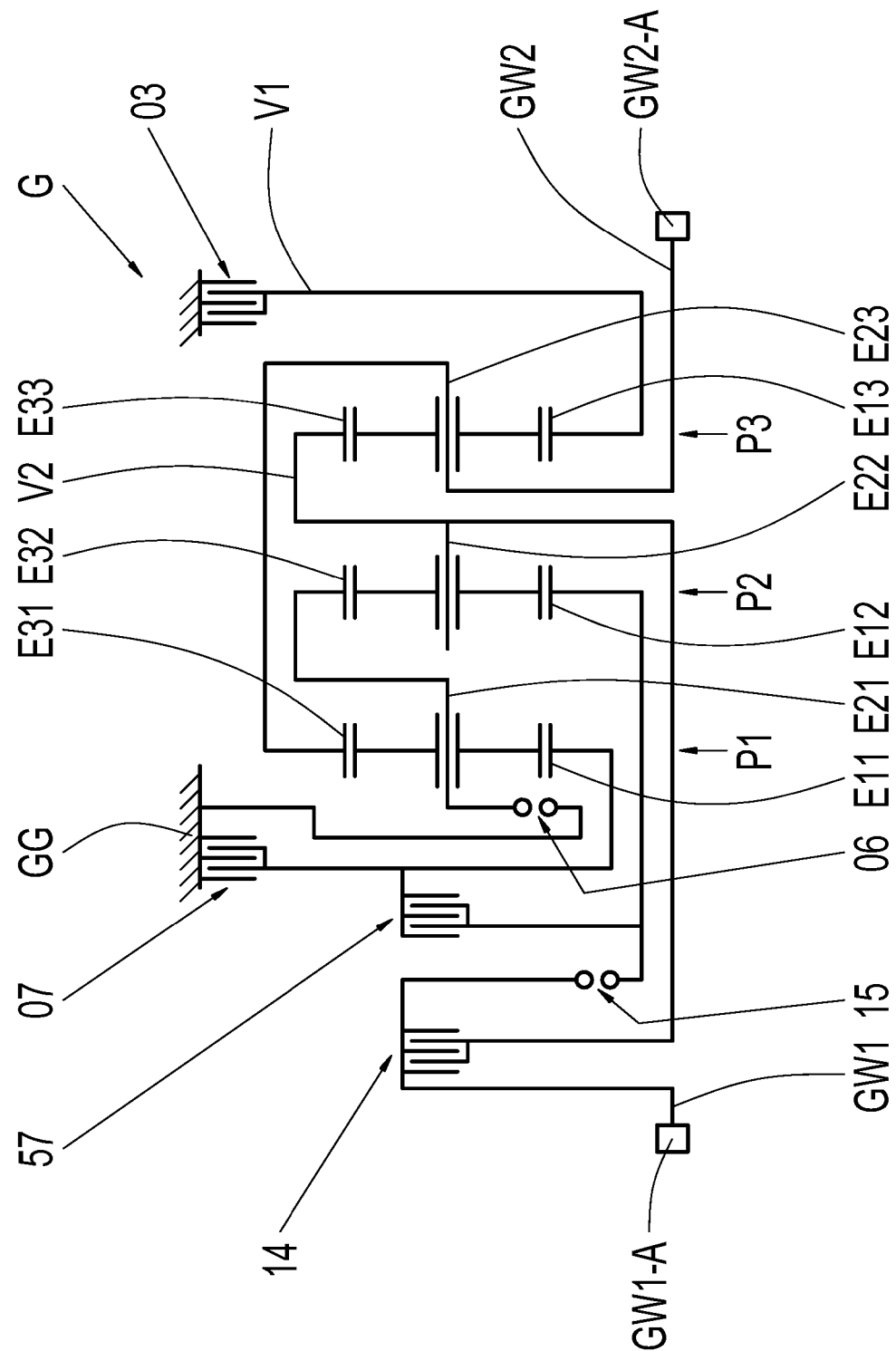

FIG. 4 schematically shows a transmission G according to a fourth exemplary embodiment of the invention, which corresponds to a combination of the second and third exemplary embodiments. Therefore, both the second shift element 06 and the fifth shift element 15 are form-fit shift elements. Such a variation of the type and position of the second and the fifth shift elements 06, 15 is possible for all exemplary embodiments. For the sake of clarity, these variants are no longer explicitly shown in the exemplary embodiments represented in the following.

Figure 5:
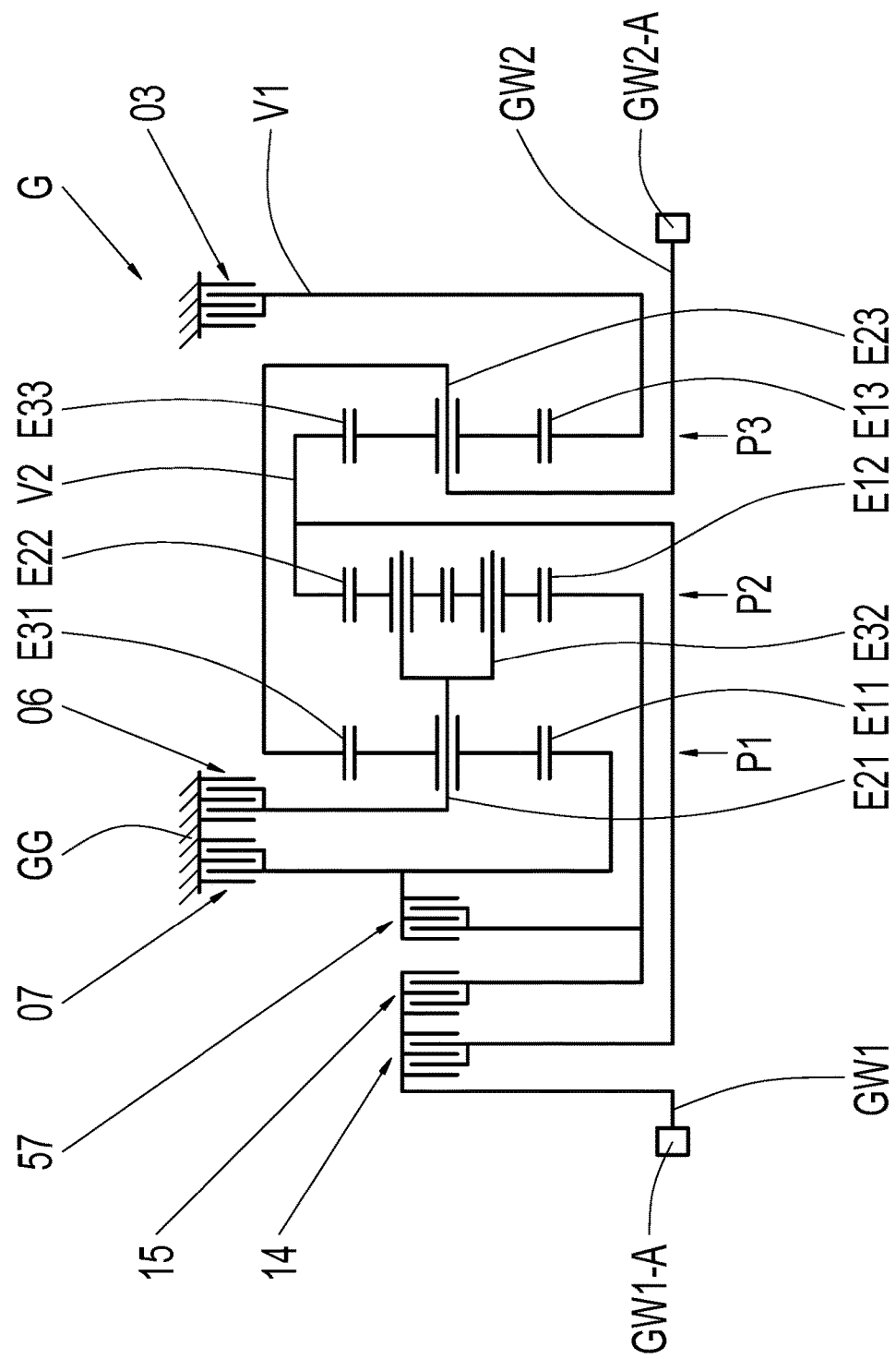

FIG. 5 schematically shows a transmission G according to a fifth exemplary embodiment of the invention, which essentially corresponds to the first exemplary embodiment represented in FIG. 1. Therein, the second planetary gear set P2 is not a minus gear set, but rather a plus gear set. Therefore, the carrier of the first planetary gear set P1 is now connected to the carrier of the second planetary gear set P2 and the ring gear of the second planetary gear set P2 is connected to the ring gear of the third planetary gear set P3. By engaging the fourth shift element 14, a connection is now established between the input shaft GW1 and the ring gear of the second planetary gear set P2. The ring gear of the second planetary gear set P2 is now its second element E22 and the carrier of the second planetary gear set P2 is now its third element E23. Such a variation of the type of construction of the second planetary gear set P2 is applicable for all exemplary embodiments.

Figure 6:
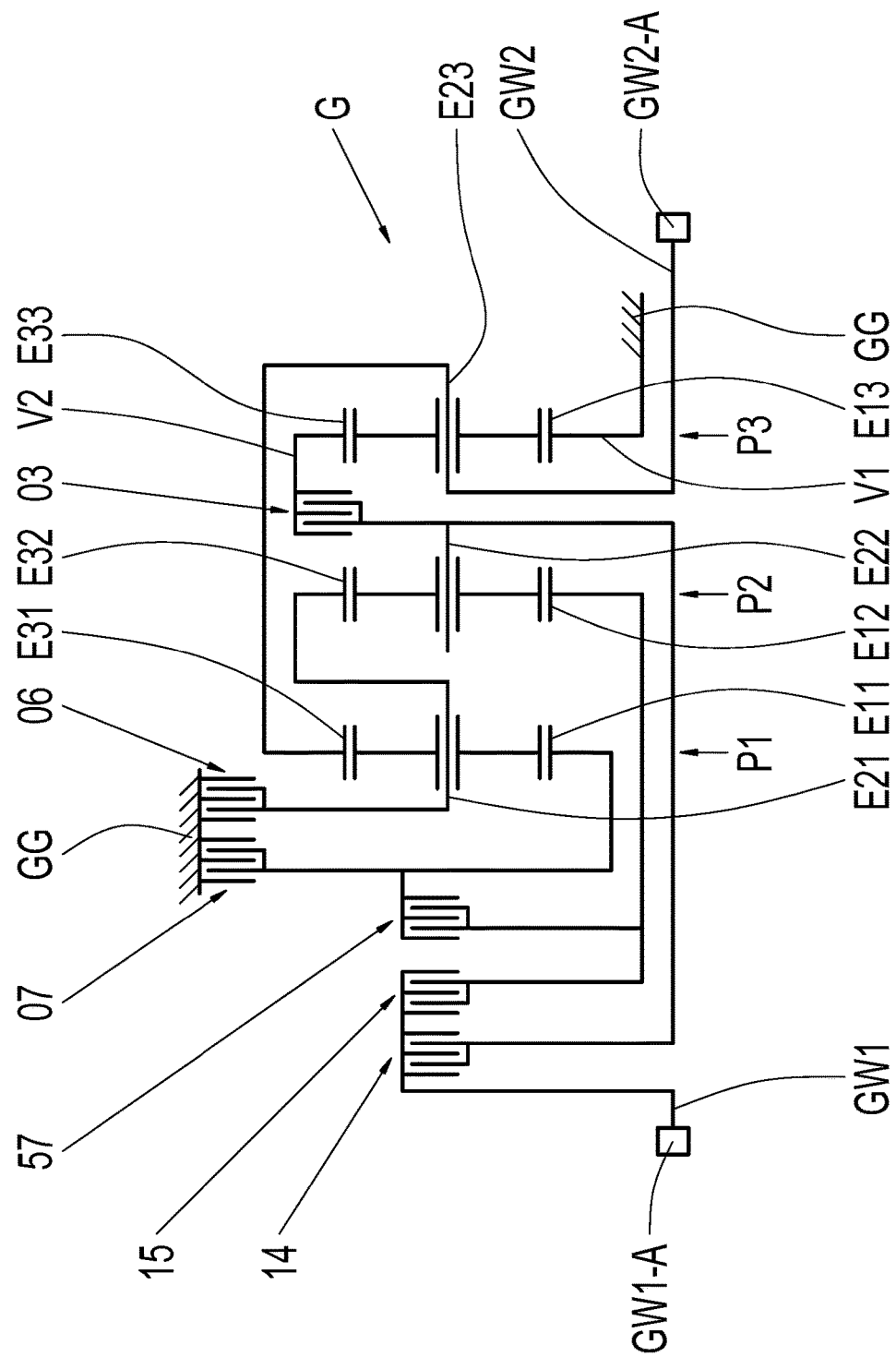

FIG. 6 schematically shows a transmission G according to a sixth exemplary embodiment of the invention, which essentially corresponds to the first exemplary embodiment represented in FIG. 1. Therein, the second coupling V2 is now represented by a shiftable connection, in that the first shift element 03 is arranged in the operative connection between the second element E22 of the second planetary gear set P2 and the third element E33 of the third planetary gear set P3. The first shift element is arranged, by way of example, axially between the second planetary gear set P2 and the third planetary gear set P3. The first element E13 of the third planetary gear set P3 is therefore permanently connected to the rotationally fixed component GG, whereby a permanently rotationally fixed connection exists in the first coupling V1. This variation is also applicable for all exemplary embodiments.

Figure 7:
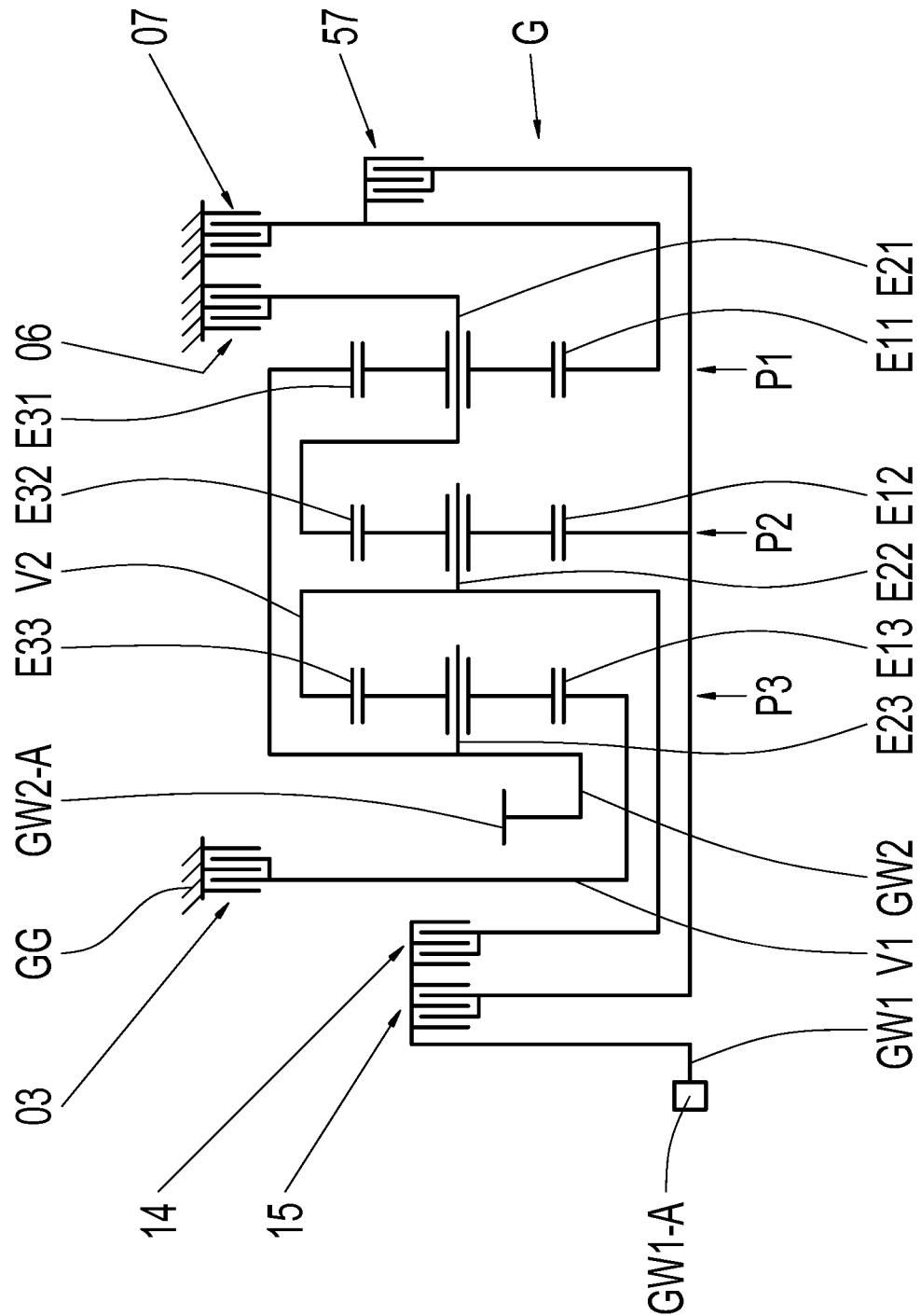

FIG. 7 schematically shows a transmission G according to a seventh exemplary embodiment of the invention, which essentially corresponds to the first exemplary embodiment represented in FIG. 1. Only the spatial arrangement of the three planetary gear sets P1, P2, P3 and of the shift elements 03, 06, 07, 14, 15, 57 has been changed. Proceeding from that axial end of the transmission G to which the external interface GW1-A of the input shaft GW1 is assigned, the three planetary gear sets P1, P2, P3 are successively arranged in the following axial sequence: third planetary gear set P3, second planetary gear set P2, first planetary gear set P1. The external interfaces GW1-A, GW2-A of the input shaft GW1 and the output shaft GW2 are now arranged in the area of the same axial end of the transmission G. The external interface GW2-A of the output shaft GW2 is a tooth system which is configured for intermeshing with a shaft which includes a corresponding tooth system and is axially parallel to the main axis of the transmission G. The transmission G according to the seventh exemplary embodiment is therefore suitable for the application in a motor vehicle whose drive train is aligned transversely to the direction of travel of the motor vehicle. The first, fourth, and fifth shift elements 03, 14, 15 are arranged in the area of the external interface GW1-A of the input shaft GW1. The second, third, and sixth shift elements 06, 07, 57 are arranged in the area of the axial end of the transmission G that is positioned opposite the external interface GW1-A of the input shaft GW1. This applies for all embodiments having such an arrangement of the planetary gear sets P1, P2, and P3 and external interfaces GW1-A, GW2-A of the input shaft GW1 and output shaft GW2, provided the first coupling V1 is a shiftable connection.

Figure 8:
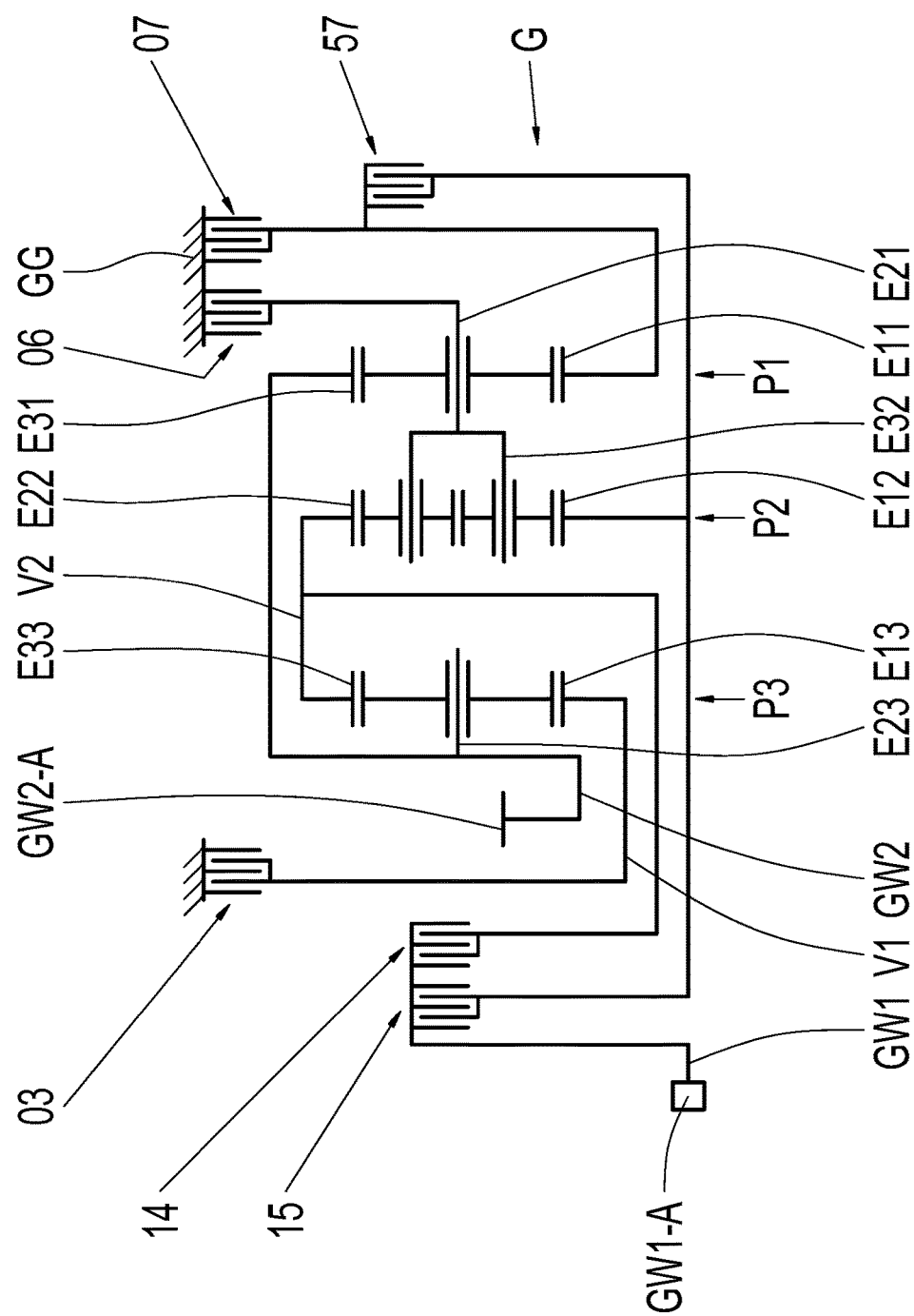

FIG. 8 schematically shows a transmission G according to an eighth exemplary embodiment of the invention, which essentially corresponds to the seventh exemplary embodiment represented in FIG. 7. Only the type of the second planetary gear set P2 has been changed, and therefore the second planetary gear set P2 is now a plus gear set. The connections to the carrier and ring gear of the second planetary gear set P2 were correspondingly changed.

Figure 9:
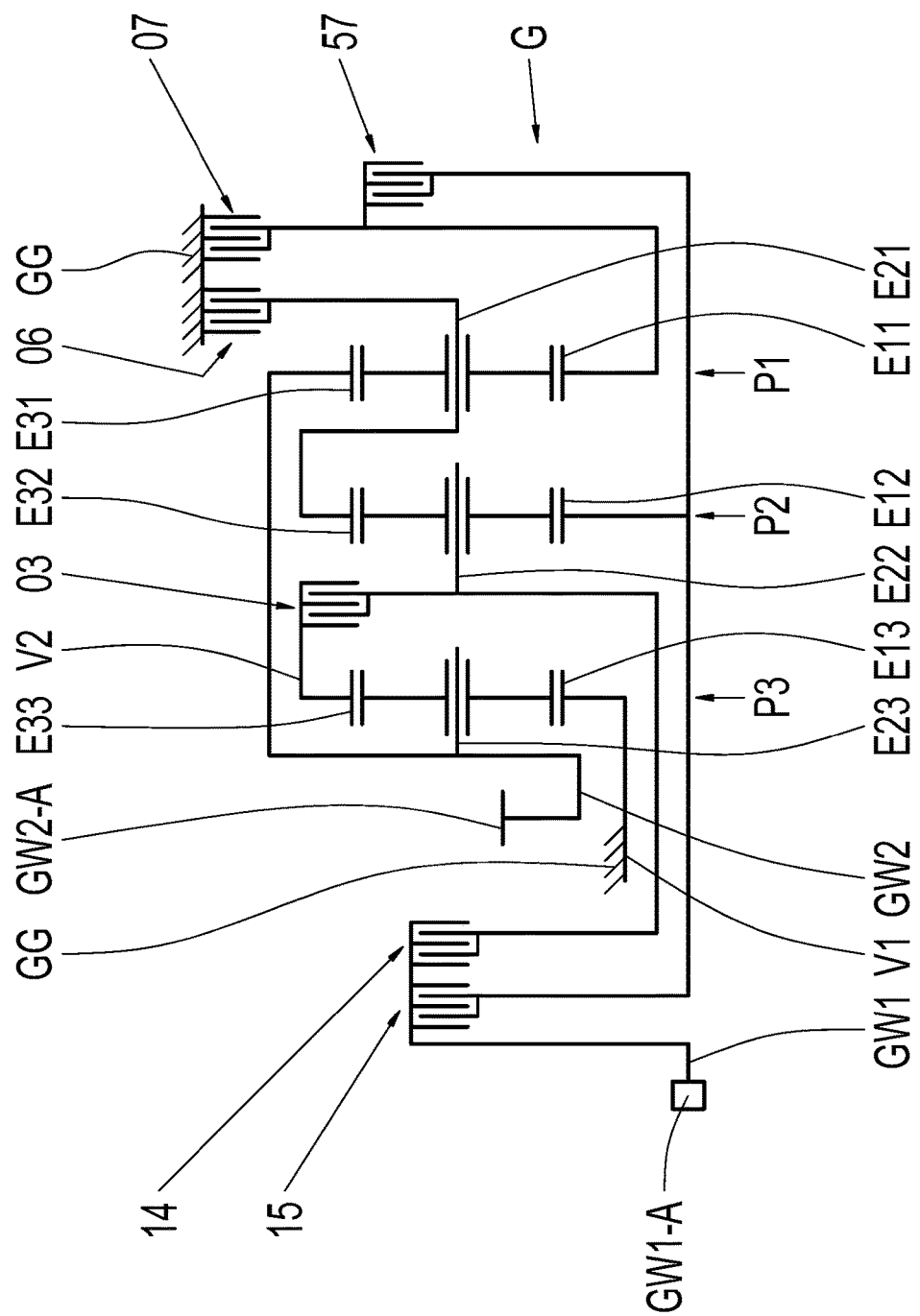

FIG. 9 schematically shows a transmission G according to a ninth exemplary embodiment of the invention, which essentially corresponds to the seventh exemplary embodiment represented in FIG. 7. Therein, the second coupling V2 is a shiftable connection, in that the first shift element 03 is arranged in the operative connection between the third element E33 of the third planetary gear set P3 and the second element E22 of the second planetary gear set P2. The first shift element 03 is arranged, by way of example, axially between the third planetary gear set P3 and the second planetary gear set P2. The first coupling V1 is a permanently rotationally fixed connection, in that the first element E13 of the third planetary gear set P3 is permanently connected to the rotationally fixed component GG.

FIG. 10 shows a shift pattern which is applicable for the transmission G according to the first to ninth exemplary embodiments. In the rows of the shift pattern, one reverse gear R1 and a first to seventh forward gear 1 to 7 are indicated. In this case, a total of four variants 4.1, 4.2, 4.3, 4.4 are indicated for forming the fourth forward gear 4. In the columns of the shift pattern, an X indicates which of the shift elements 03, 06, 07, 14, 15, 57 is engaged in which gear 1 to 7, R1. The gears refer to fixed transmission ratios between the input shaft GW1 and the output shaft GW2 of the transmission G in this case.

Figure 11:
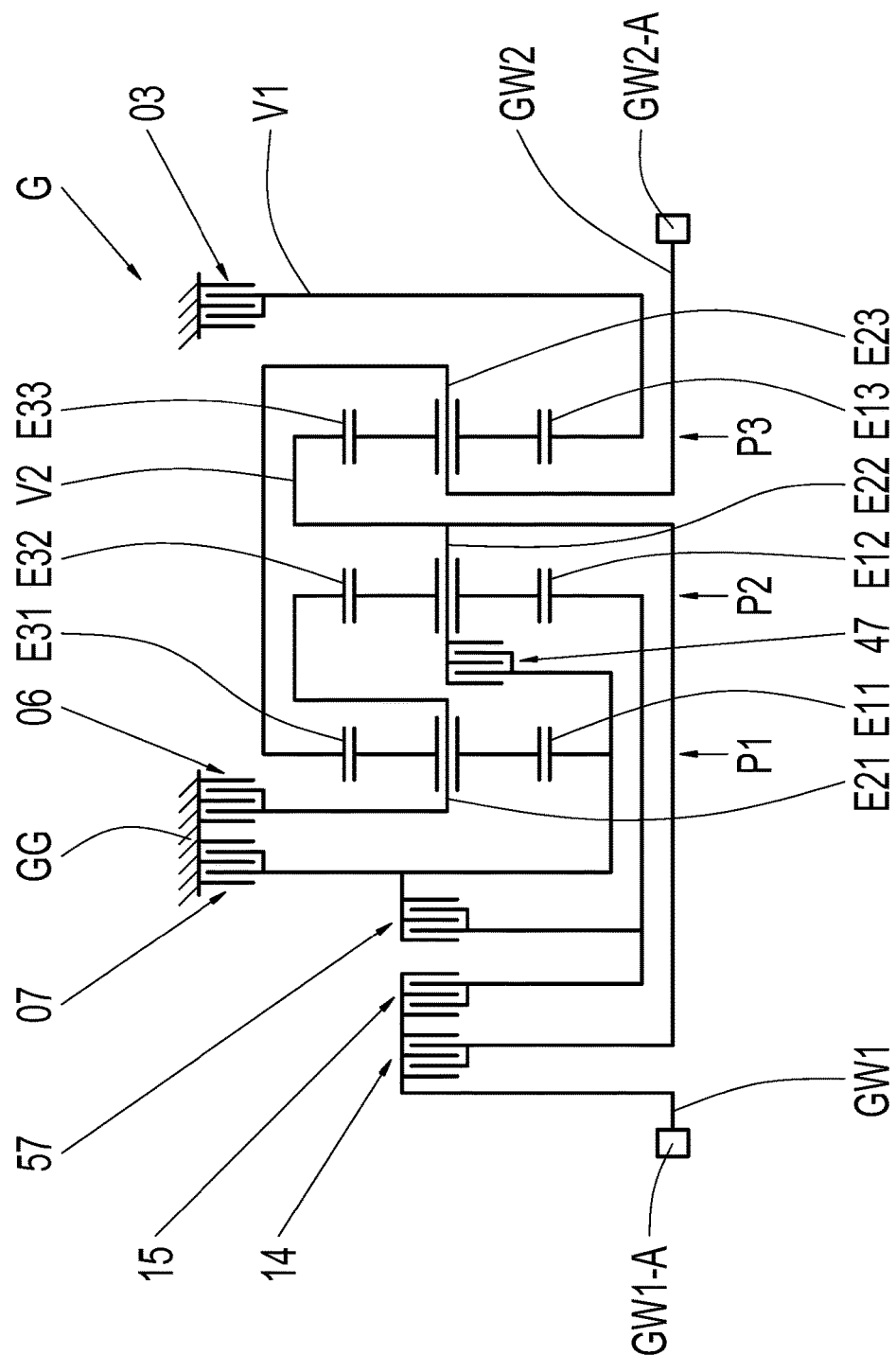
FIG. 11 shows a schematic representation of a transmission according to a tenth exemplary embodiment of the invention.

FIG. 11 schematically shows a transmission G according to a tenth exemplary embodiment of the invention. In contrast to the first exemplary embodiment represented in FIG. 1, the transmission G now includes a seventh shift element 47. By engaging the seventh shift element 47, the first element E11 of the first planetary gear set P1 is connected to the second element E22 of the second planetary gear set P2. The seventh shift element 47 is arranged, by way of example, axially between the first and the second planetary gear sets P1, P2. The seventh shift element 47 is preferably a friction-locking shift element, although it can also be a form-fit shift element.

FIG. 12 shows a shift pattern for the transmission G according to the tenth exemplary embodiment. The reverse gear R1 as well as a second reverse R2, a third reverse gear R3, and a first to eighth forward gear 1b to 8b are indicated in the rows of the shift pattern. In the columns of the shift pattern, an X indicates which of the shift elements 03, 06, 07, 14, 15, 57, 47 is engaged in which of the reverse gears R1, R2, R3 and forward gears 1b to 8b. A total of five variants 5.1b, 5.2b, 5.3b, 5.4b, 5.5b are available for forming the fifth forward gear. A total of four variants 6.1b, 6.2b, 6.3b, 6.4b are available for forming the sixth forward gear. Through the seventh shift element 47, the transmission G is therefore expanded to a transmission including eight forward gears 1b to 8b between the input shaft GW1 and the output shaft GW2.

Figure 13:
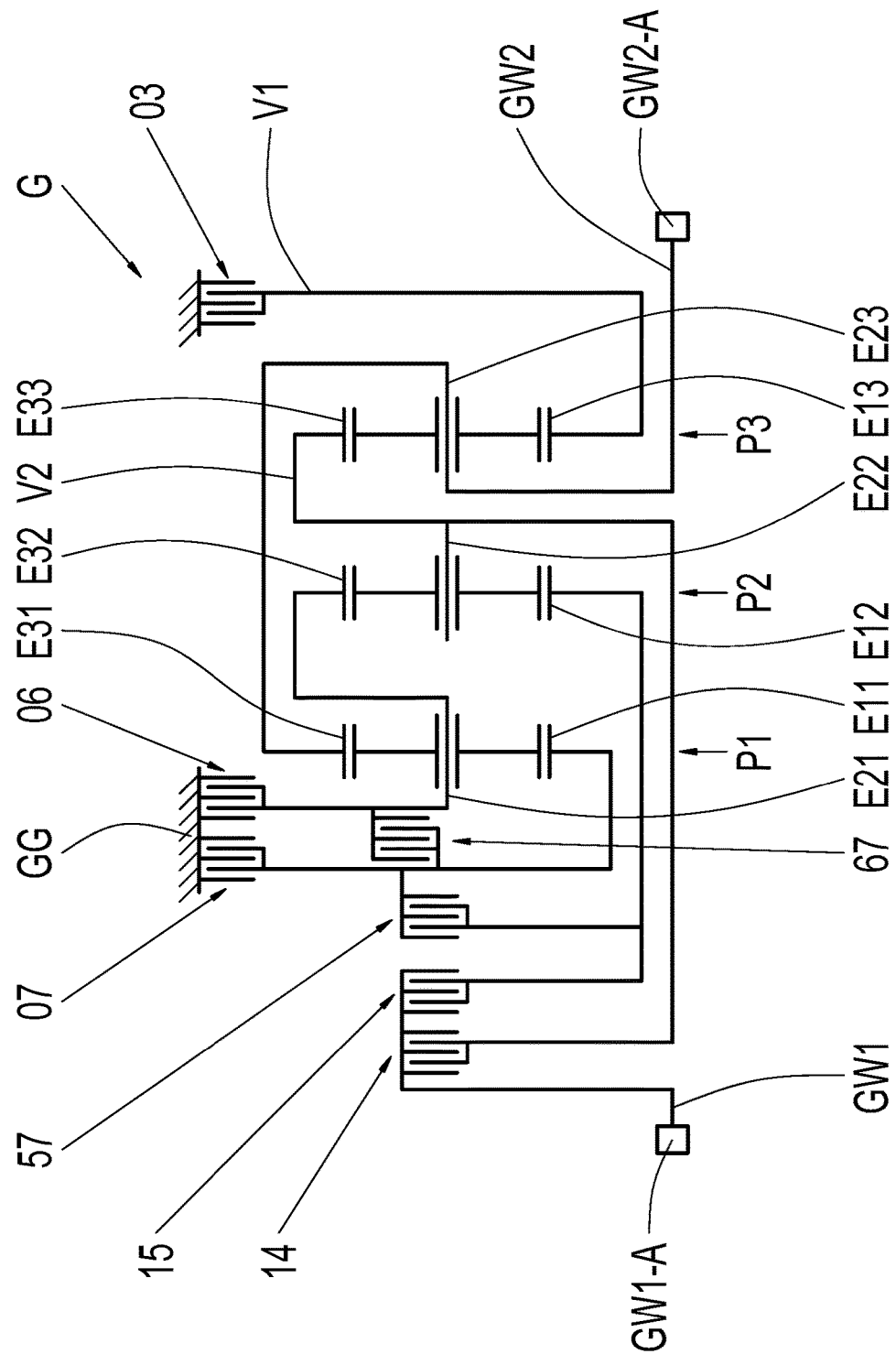
FIG. 13 and FIG. 14 each show a schematic representation of a transmission according to an eleventh and a twelfth exemplary embodiment of the invention.

FIG. 13 schematically shows a transmission G according to an eleventh exemplary embodiment of the invention. In contrast to the first exemplary embodiment represented in FIG. 1, the transmission G according to the eleventh exemplary embodiment includes seven shift elements. In this case, the seventh shift element 67 is configured for connecting the first element E11 of the first planetary gear set P1 to the second element E21 of the first planetary gear set P1. By way of example, sections of the seventh shift element 67 are arranged radially within the third shift element 06. By engaging the seventh shift element 67, the first planetary gear set P1 is therefore interlocked, and therefore its elements E11, E21, E31 have the same rotational speed.

Figure 14:
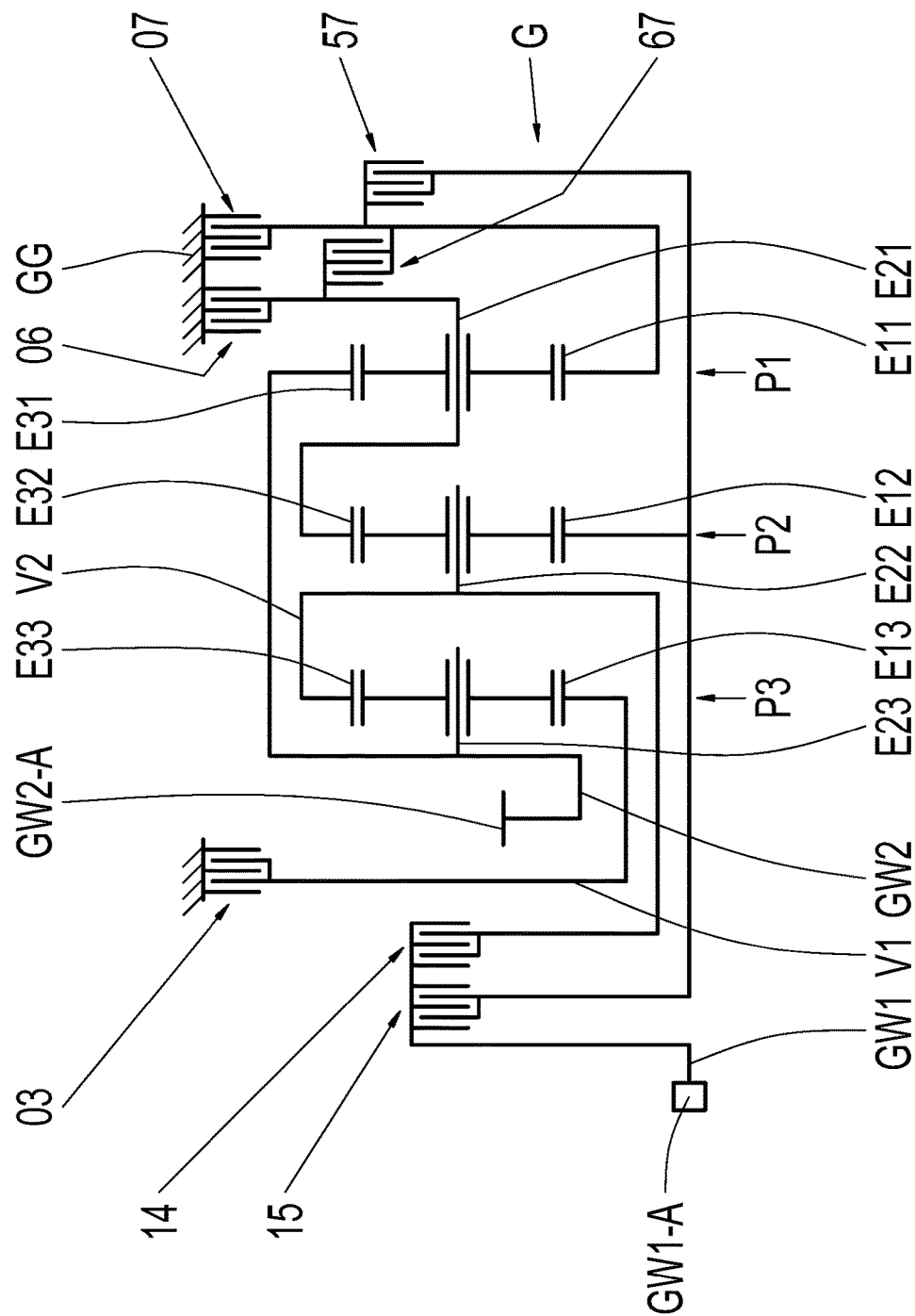

FIG. 14 schematically shows a transmission G according to a twelfth exemplary embodiment of the invention, which essentially corresponds to the eleventh exemplary embodiment. Only the arrangement of the individual transmission elements has been changed, and therefore the transmission G is now suitable for the application in a drive train aligned transversely to the direction of travel of the vehicle.

FIG. 15 shows a shift pattern for the transmission G according to the eleventh and twelfth exemplary embodiments. The reverse gear R1 and the first to eighth forward gears 1b to 8b are indicated in the rows of the shift pattern. In the columns of the shift pattern, an X indicates which of the shift elements 03, 06, 07, 14, 15, 57, 67 is engaged in which gear R1, 1b to 8b. The formation of the forward gears 1b to 8b using the seventh shift element marked as 67 is identical to the gear formation using the seventh shift element marked as 47. Due to the seventh shift element 67, it is therefore possible, in the same way, to provide one additional forward gear between the input shaft GW1 and the output shaft GW2.

Figure 16:
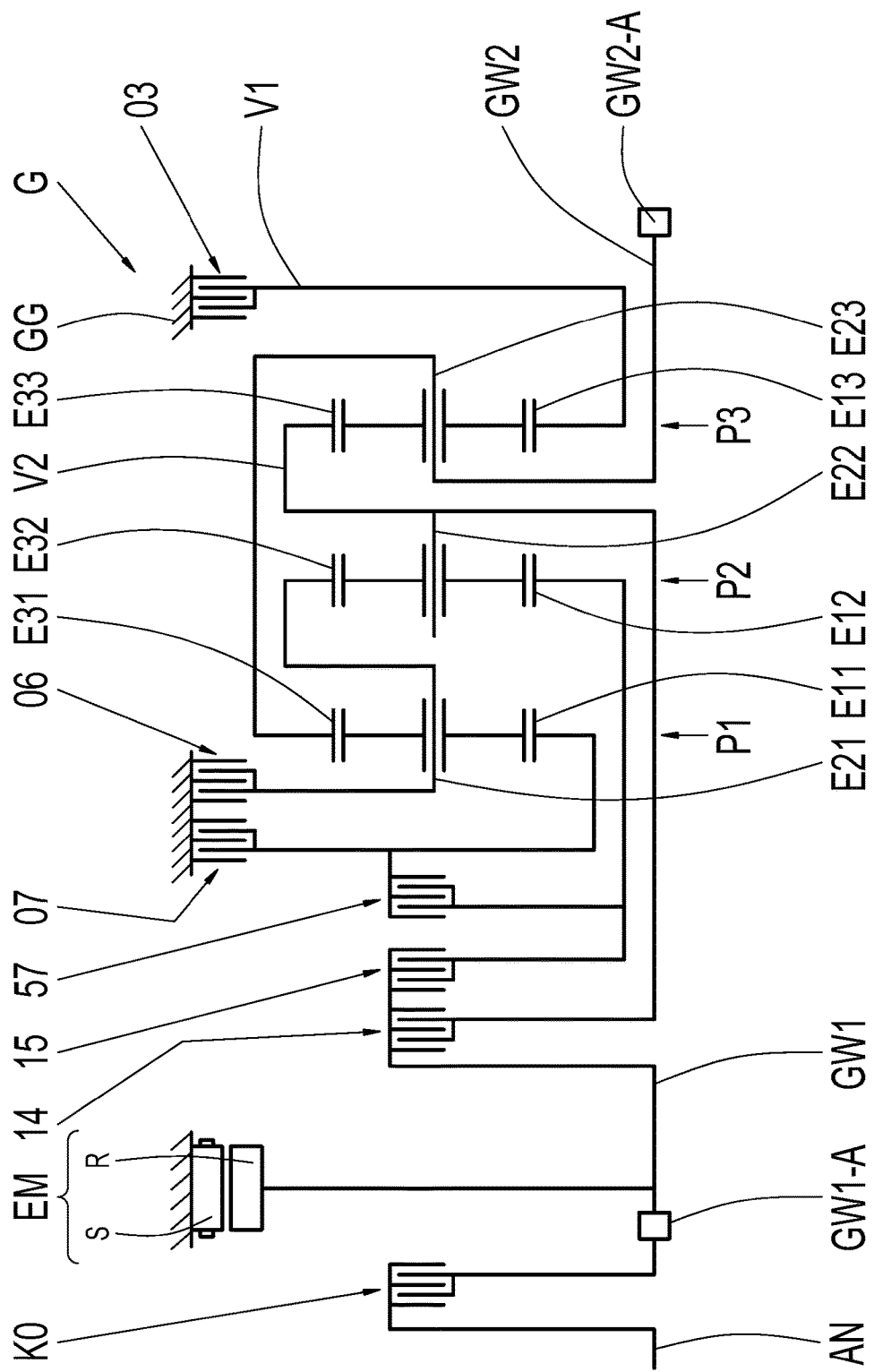

FIG. 16 schematically shows a transmission G according to a thirteenth exemplary embodiment of the invention, which essentially corresponds to the first exemplary embodiment represented in FIG. 1. The transmission G now includes an electric machine EM which includes a rotationally fixed stator S and a rotary rotor R. In this case, the rotor R is permanently connected to the input shaft GW1. In addition, the transmission G includes a connecting shaft AN which is connectable to the input shaft GW1 via a separating clutch K0. The electric machine EM is configured for applying power to the input shaft GW1 or for drawing power therefrom. When the transmission G is utilized in the drive train of a motor vehicle, the transmission G is configured, by the electric machine EM, for driving the vehicle or decelerating the vehicle while acting as a generator.

Figure 17:
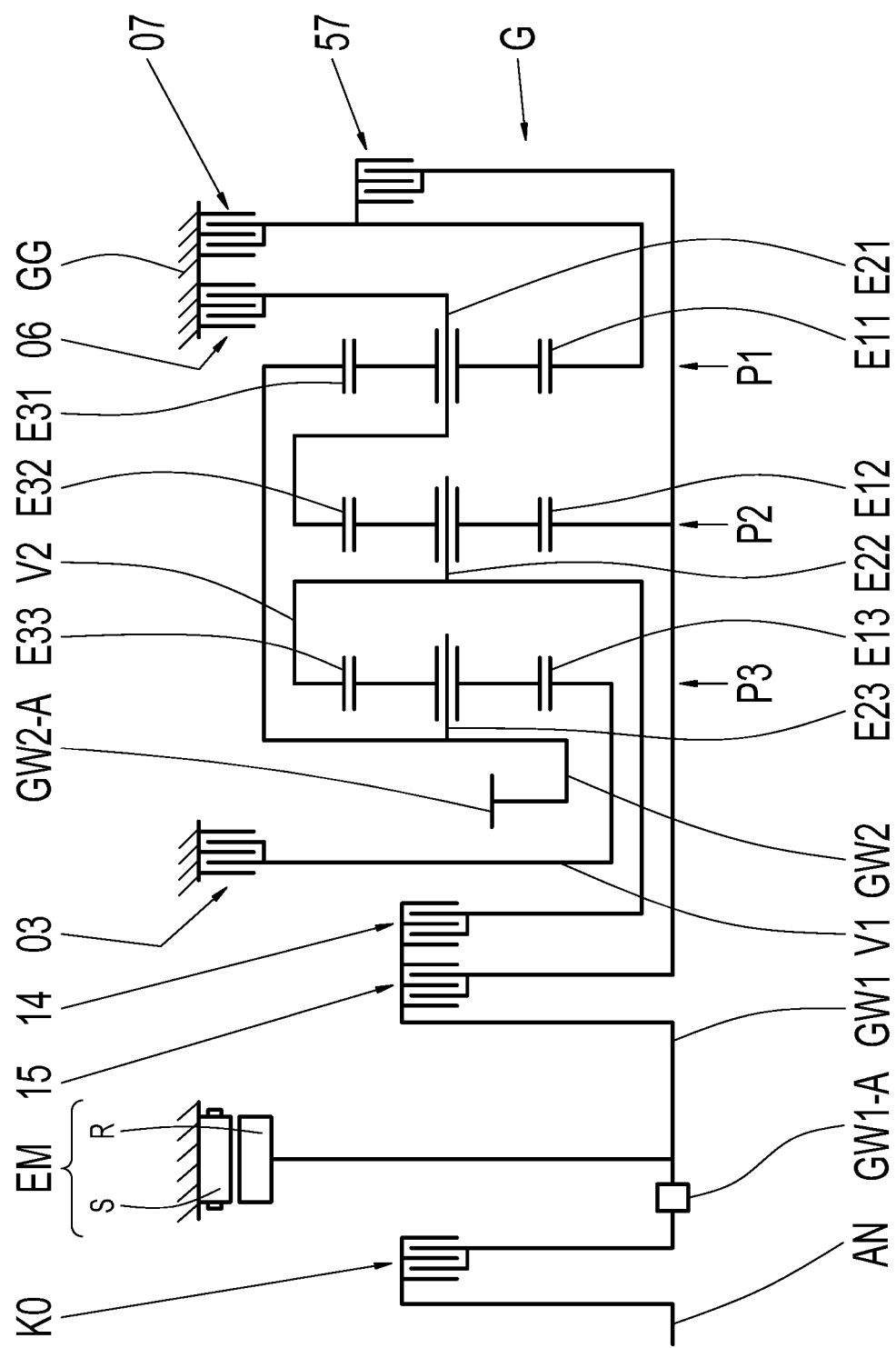

FIG. 17 schematically shows a transmission G according to a fourteenth exemplary embodiment of the invention, which essentially corresponds to the thirteenth exemplary embodiment. Only the arrangement of the transmission components has been changed, and therefore the external interface GW2-A of the output shaft GW2 is now arranged in the area of the same axial end of the transmission G as the external interface GW1-A of the input shaft GW1.

Figure 18:
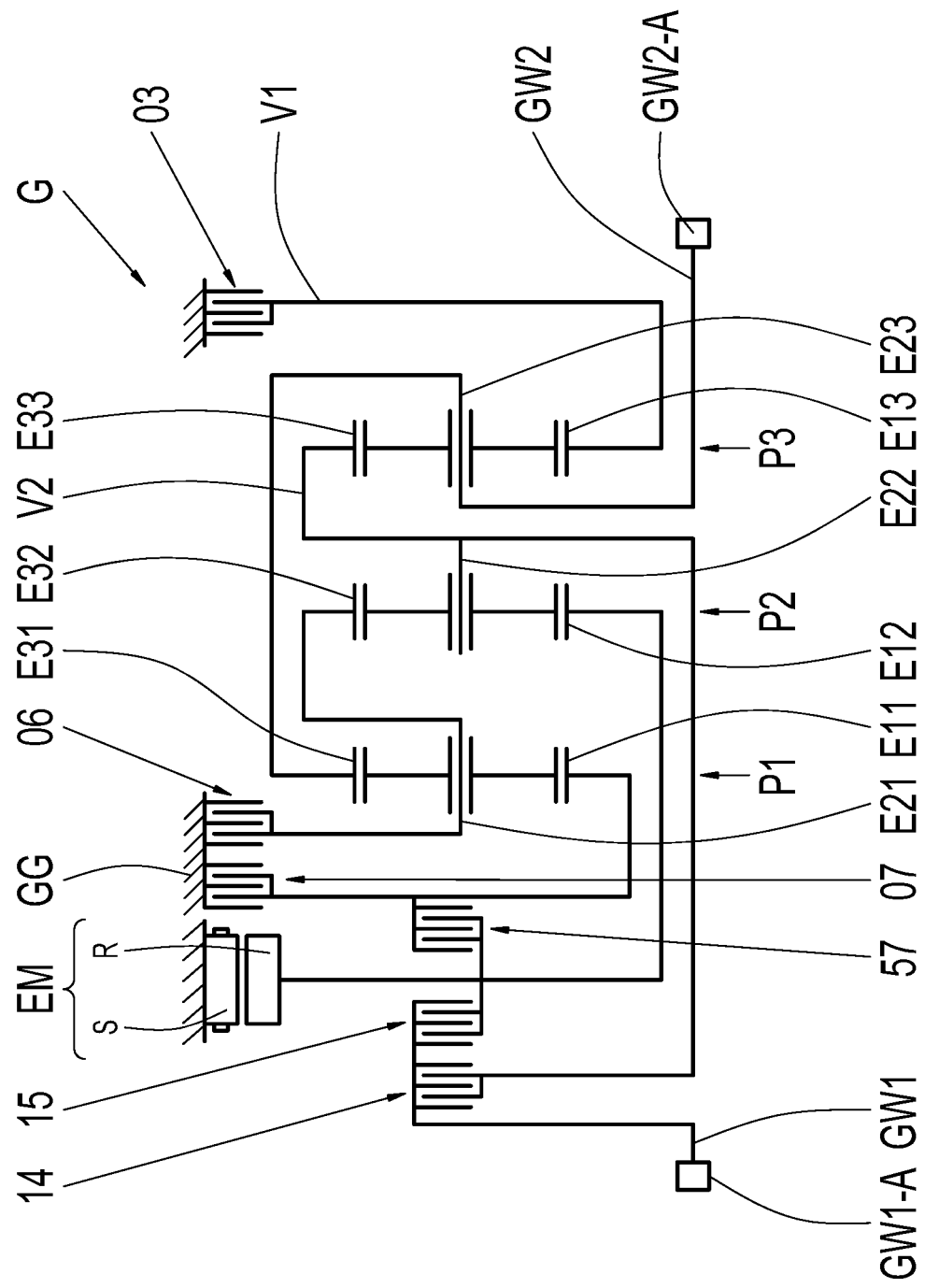

FIG. 18 schematically shows a transmission G according to a fifteenth exemplary embodiment of the invention. The rotor R of the electric machine EM is now connected to the first element E12 of the second planetary gear set P2. The connecting shaft AN and the separating clutch K0 can be omitted. Due to such a connection of the electric machine EM, various electrically drivable driving gears as well as a continuously variable operation of the transmission G are possible. For such a continuously variable operation, the fourth shift element 14 is to be engaged, and therefore torque from the transmission-external drive source acts onto the second element E22 of the second planetary gear set P2 via the engaged fourth shift element 14. The electric machine EM acts on the first element E12 of the second planetary gear set P2. When the speed of the input shaft GW1 has been predefined and the speed of the rotor R has been specified, the speed of the third element E32 of the second planetary gear set P2 is established. By engaging the third shift element 07 or the sixth shift element 57, a torque transmission takes place proceeding from the third element E23 of the second planetary gear set P2 via the first planetary gear set P1 to the output shaft GW2.

Figure 19:
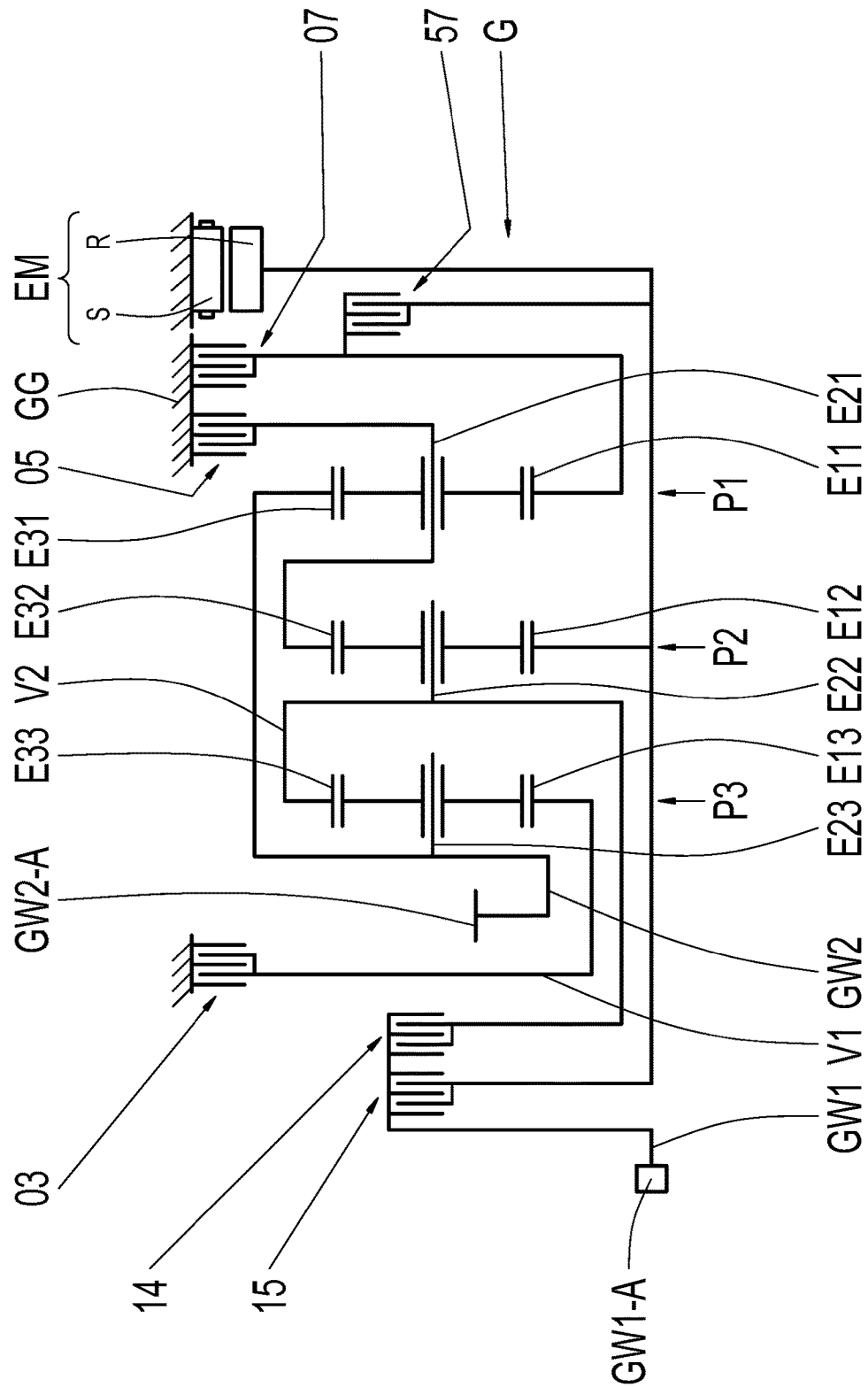

FIG. 19 schematically shows a transmission G according to a sixteenth exemplary embodiment of the invention, which essentially corresponds to the fifteenth exemplary embodiment. Only the geometric arrangement of the transmission components has been changed, and therefore the external interface GW2-A of the output shaft GW2 is now arranged in the area of the same axial end of the transmission G as the external interface GW1-A of the input shaft GW1. The electric machine EM is arranged—due to its connection to the first element E12 of the second planetary gear set P2—at the axial end of the transmission G opposite to that of the external interface GW1-A of the input shaft GW1.

FIG. 20 shows a shift pattern for the transmission G according to the fifteenth and sixteenth exemplary embodiments. The reverse gear R1 and the seven forward gears 1 to 7 between the input shaft GW1 and the output shaft GW2 are indicated in the rows of the shift pattern. The formation of the reverse gear R1 and the seven forward gears 1 to 7 corresponds to the gear formation in the preceding exemplary embodiments of the transmissions G including six shift elements. Indicated in the rows of the shift pattern as well are an electrically drivable reverse gear ER, a first to third electrically drivable forward gear E1 to E3 as well as a first superimposed operating mode EDA1 and a second superimposed operating mode EDA2. In the columns of the shift pattern, an X indicates which of the shift elements 03, 06, 07, 14, 15, 57 is engaged in which gear or operating mode. The electrically drivable reverse gear ER and the electrically drivable forward gears E1 to E3 relate to fixed transmission ratios between the first element E12 of the second planetary gear set P2 and the output shaft GW2. In these electrically drivable gears ER, E1, E2, E3, no torque transmission to the input shaft GW1 takes place, since the fourth and fifth shift elements 14, 15 are disengaged. A transmission-external drive unit, which is connected to the input shaft GW1, is therefore not entrained in the electric gears ER, E1, E2, E3. The superimposed operating modes EDA1, EDA2 relate to continuously variable operating modes of the transmission G. When the speed of the input shaft GW1 has been predefined and the speed of the rotor R has been specified, a continuously variable operation of the transmission G is possible in the superimposed operating modes EDA1, EDA2. In the superimposed operating modes EDA1, EDA2, a starting process of a motor vehicle including the transmission G can therefore be represented, for example.

Figure 21:
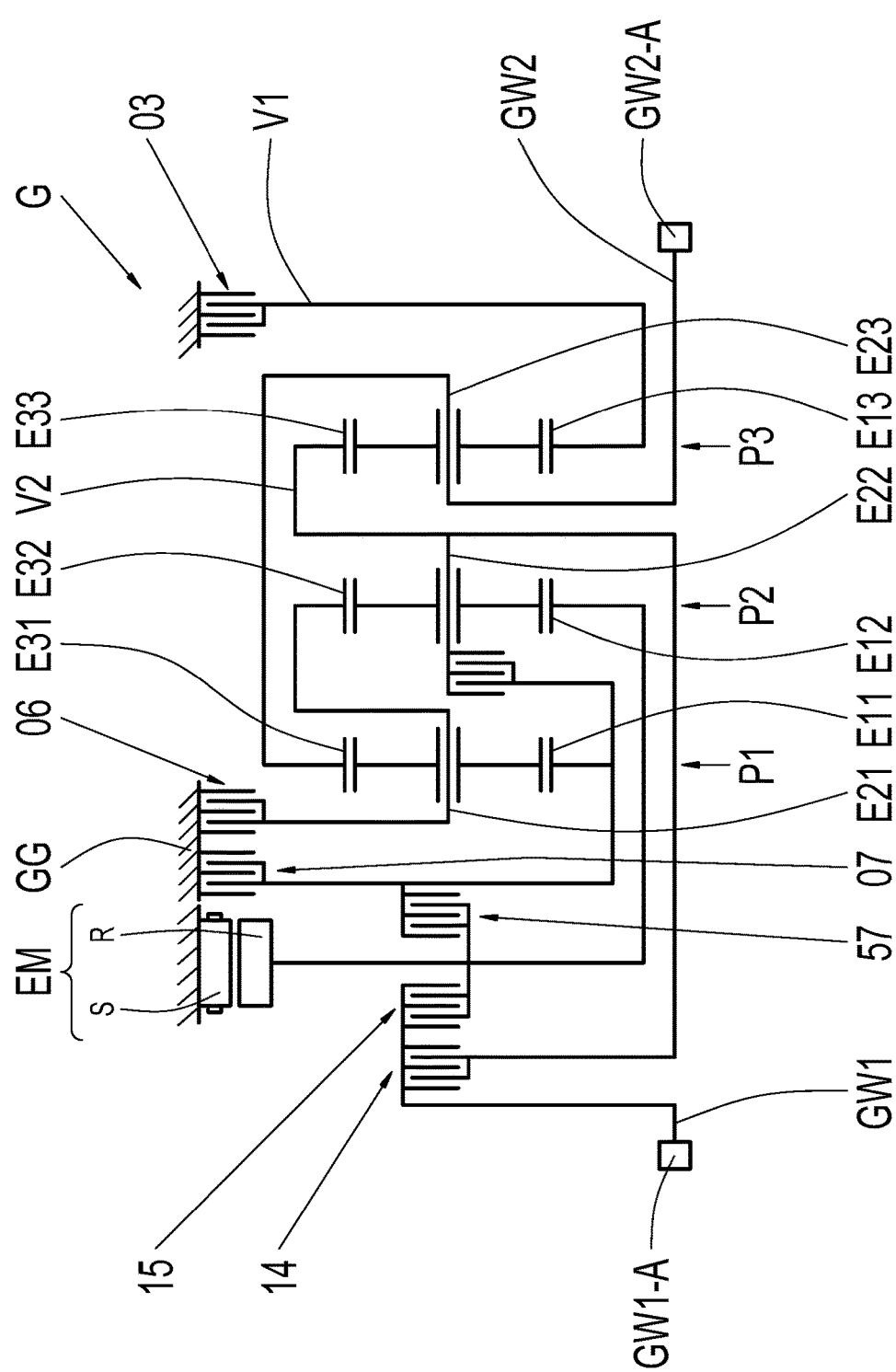

FIG. 21 schematically shows a transmission G according to a seventeenth exemplary embodiment of the invention. This essentially corresponds to the tenth exemplary embodiment represented in FIG. 11, which includes the seventh shift element 47, supplemented with an electric machine EM connected to the first element E12 of the second planetary gear set P2.

FIG. 22 shows a shift pattern for the transmission G according to the seventeenth exemplary embodiment, wherein the formation of the reverse gears R1 to R3 and forward gears 1b to 8b between the input shaft GW1 and the output shaft GW2 is represented.

FIG. 23 shows a shift pattern for the transmission G according to the seventeenth exemplary embodiment, wherein indicated in the rows of the shift pattern are three electrically drivable reverse gears ER, ER2, ER3, five electrically drivable forward gears E1b to E5b, and the two superimposed operating modes EDA1, EDA2. In the columns of the shift pattern, an X indicates which of the shift elements 03, 06, 07, 14, 15, 57, 47 is engaged in which electrically drivable gear ER, ER2, ER3, E1b to E5b and superimposed operating modes EDA1, EDA2. Through the seventh shift element 47, it is possible to form two further electrically drivable reverse gears ER2, ER3. It is also possible through of the seventh shift element 47 to form two further electrically drivable forward gears E3b, E5b. The electrically drivable gears relate, in this case, to fixed transmission ratios between the first element E12 of the second planetary gear set P2 and the output shaft GW2.

Figure 24:
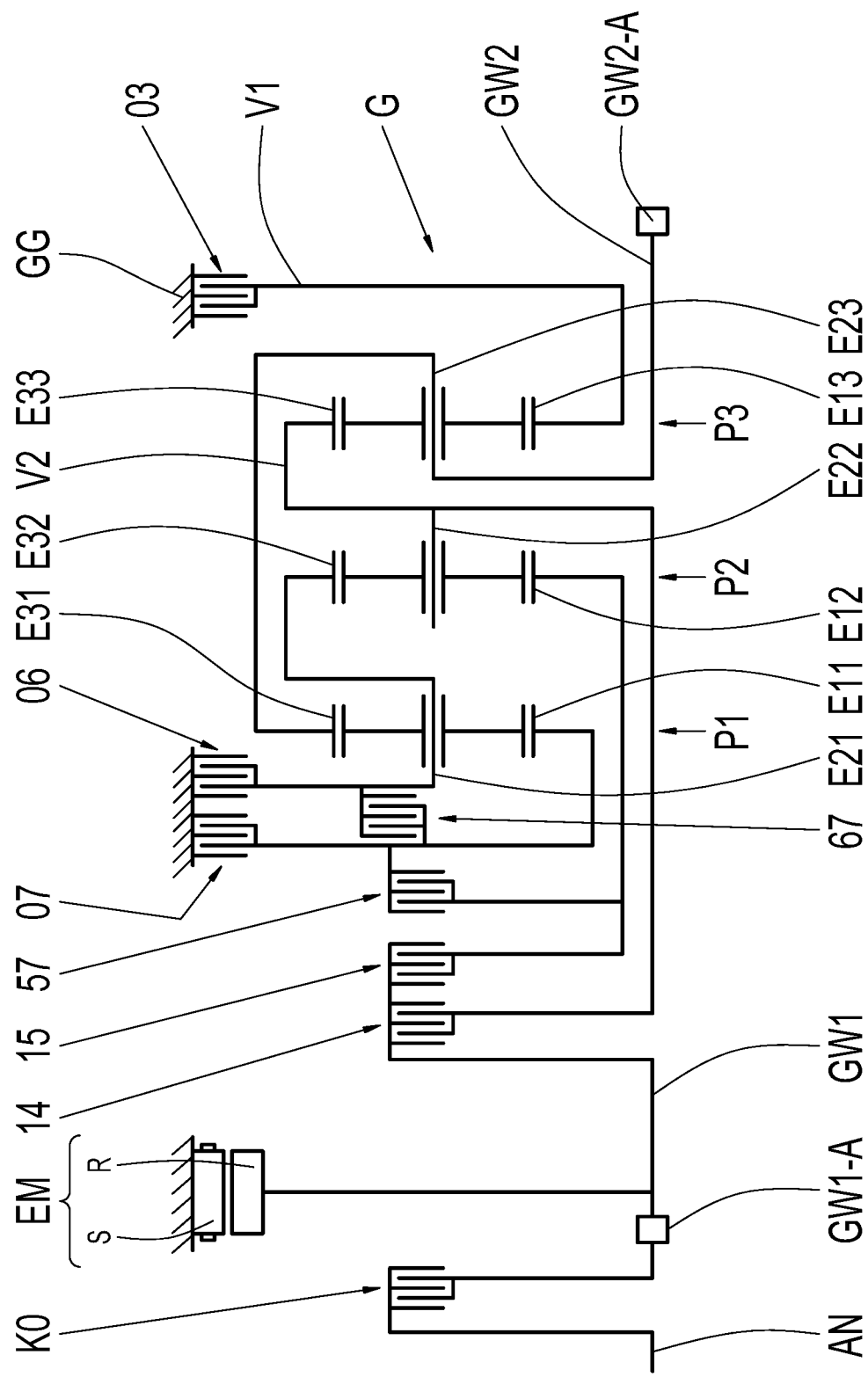
FIG. 24 to FIG. 27 each show a schematic representation of a transmission according to an eighteenth to twenty-first exemplary embodiment of the invention.

FIG. 24 schematically shows a transmission G according to an eighteenth exemplary embodiment of the invention, which essentially corresponds to the eleventh exemplary embodiment represented in FIG. 13 and therefore includes the seventh shift element 67. The transmission G also includes an electric machine EM whose rotor R is permanently connected to the input shaft GW1. In addition, the transmission G according to the eighteenth exemplary embodiment includes a connecting shaft AN which is connectable to the input shaft GW1 via a separating clutch K0. The connecting shaft AN is used for connecting to a transmission-external drive unit, for example an internal combustion engine.

Figure 25:
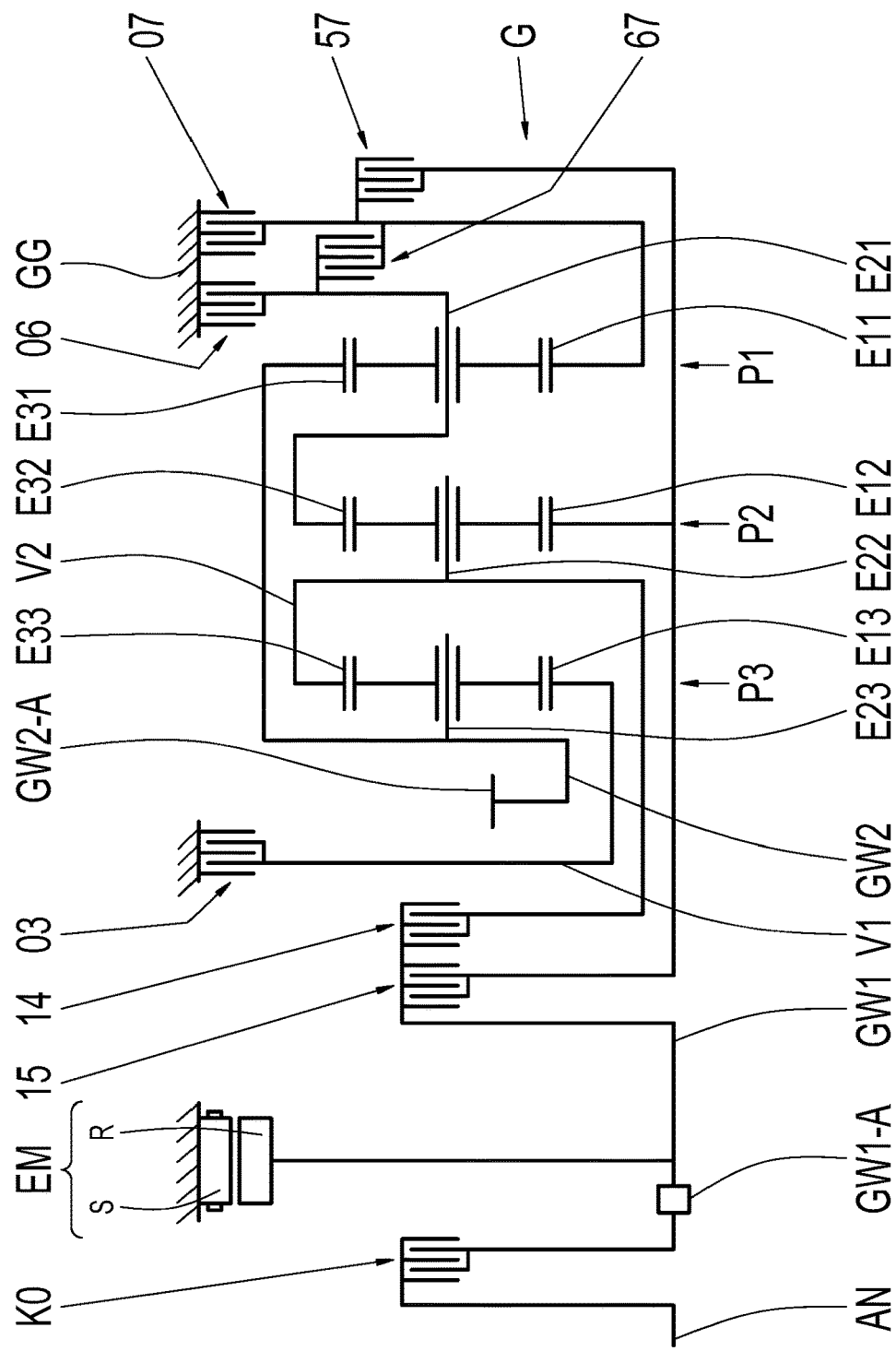

FIG. 25 schematically shows a transmission G according to a nineteenth exemplary embodiment of the invention, which essentially corresponds to the eighteenth exemplary embodiment represented in FIG. 24. Only the geometric arrangement of the transmission components has been changed, and therefore the external interface GW2-A of the output shaft GW2 is now arranged in the area of the same axial end of the transmission G as the external interface GW1-A of the input shaft GW1.

Figure 26:
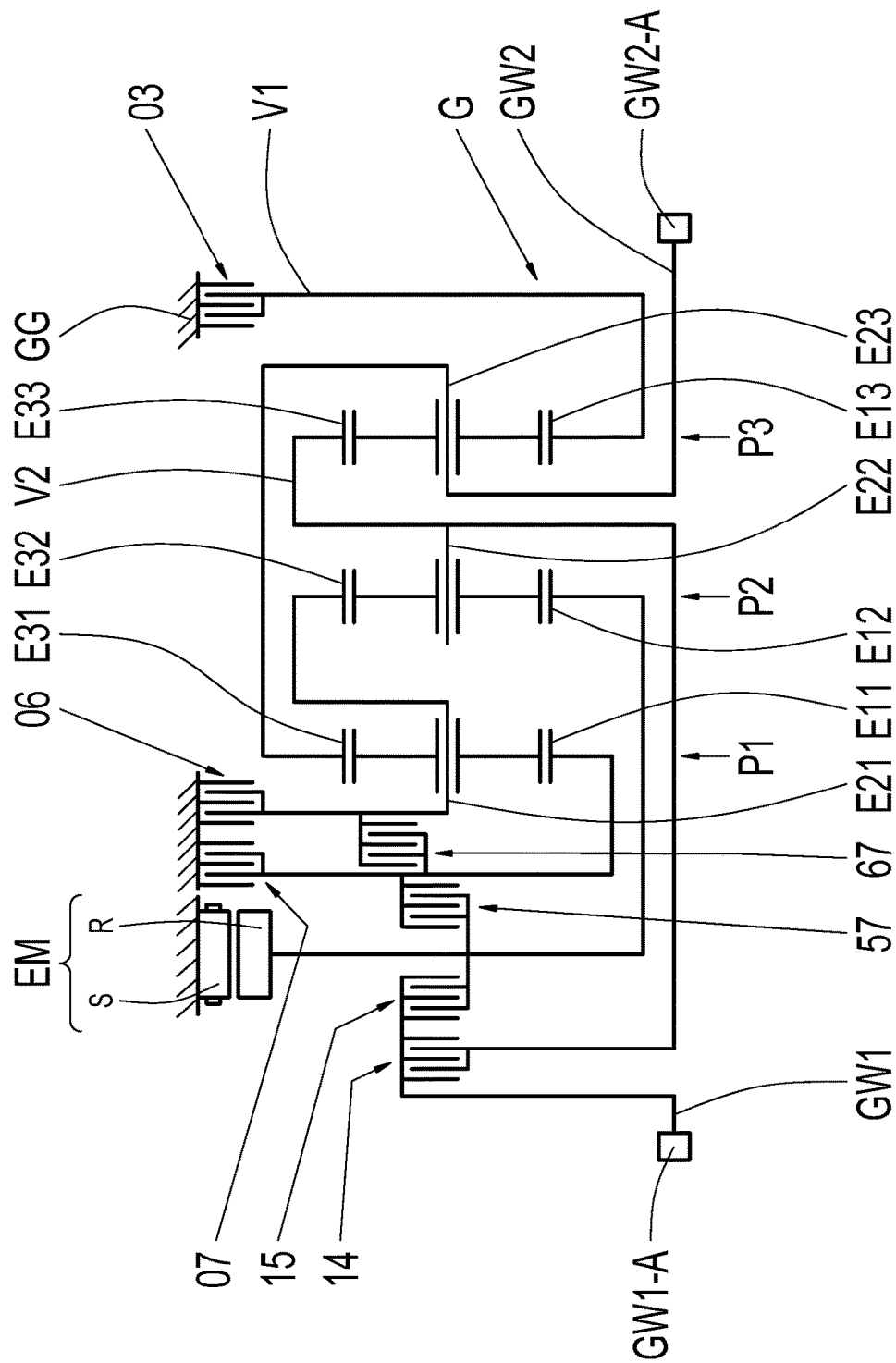

FIG. 26 schematically shows a transmission G according to a twentieth exemplary embodiment of the invention, which essentially corresponds to the eighteenth exemplary embodiment represented in FIG. 24. Only the connection of the electric machine EM has been changed, and therefore the rotor R is not connected to the input shaft GW1, but rather to the first element E12 of the second planetary gear set P2.

Figure 27:
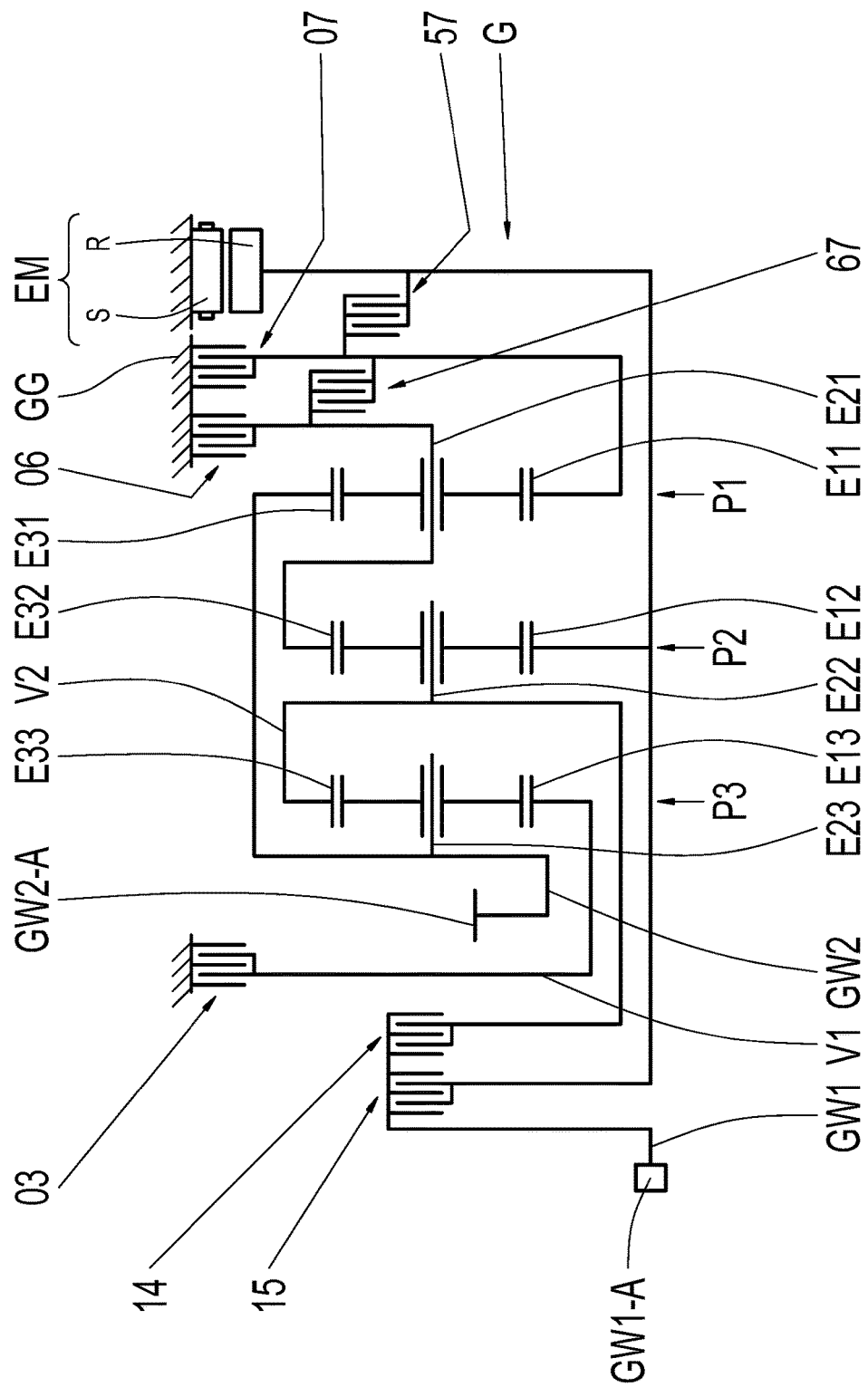

FIG. 27 schematically shows a transmission G according to a twenty-first exemplary embodiment of the invention, which essentially corresponds to the twentieth exemplary embodiment represented in FIG. 26. Only the geometric arrangement of the transmission components has been changed, and therefore the external interface GW2-A of the output shaft GW2 is now arranged in the area of the same axial end of the transmission G as the external interface GW1-A of the input shaft GW1. The electric machine EM is now arranged on the opposite axial end of the transmission G.

FIG. 28 shows a shift pattern for the transmission G according to the twentieth and the twenty-first exemplary embodiments. Represented therein is the formation of the reverse gear R1 as well as the forward gears 1b to 8b between the input shaft GW1 and the output shaft GW2.

FIG. 29 also shows a shift pattern for the transmission G according to the twentieth and the twenty-first exemplary embodiments, in which the formation of the electrically drivable forward gears E1b to E5b, as well as the electrically drivable reverse gear ER is represented. Shown in the shift pattern as well is the formation of three superimposed operating modes EDA1, EDA2, EDA3. In the columns of the shift pattern, an X indicates which of the shift elements 03, 06, 07, 14, 15, 57, 67 is engaged in which electrically drivable gear ER, E1b to E5b and the superimposed operating modes EDA1 to EDA3. The seventh shift element 67 makes it possible to form two electrically drivable forward gears E3b, E5b and to form yet another superimposed operating mode EDA3.

Figure 30:
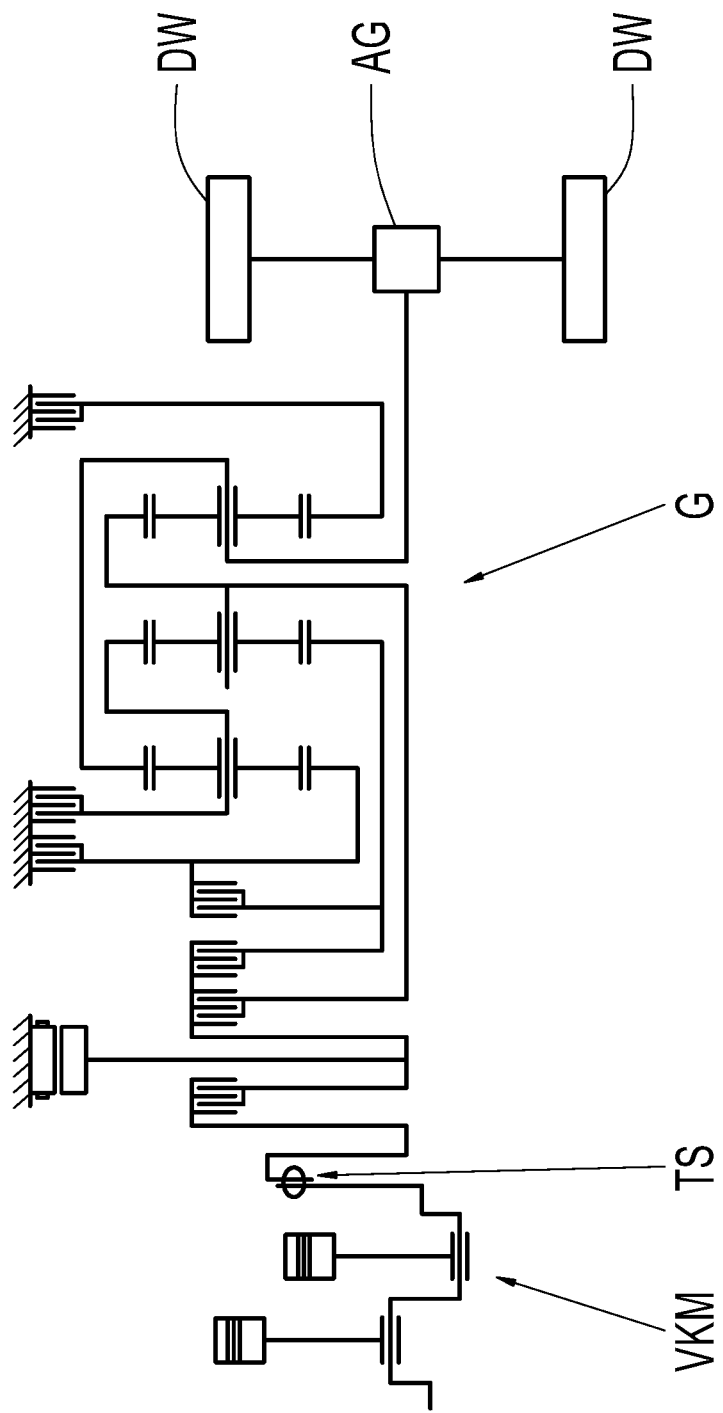
FIG. 30 shows a schematic representation of a drive train of a motor vehicle.

FIG. 30 schematically shows a drive train of a motor vehicle. An internal combustion engine VKM is connected via a torsional vibration damper TS to the connecting shaft AN of the transmission G. The transmission G represented in FIG. 30 corresponds to the thirteenth exemplary embodiment of the invention represented in FIG. 16. This is to be considered to be merely an example. The internal combustion engine VKM could also be connected via the torsional vibration damper TS directly to the input shaft GW1 of the transmission G. The transmission G could also be without an electric machine EM. The drive train could be designed with each of the present exemplary embodiments, with or without an electric machine EM. The drive train could also include a hydrodynamic torque converter which is arranged, for example, between the electric machine EM and the output shaft GW1. Such a torque converter can also include a direct drive clutch. A person skilled in the art will freely configure the arrangement and spatial position of the individual components of the drive train depending on the external peripheral conditions. The output shaft GW2 is connected to an axle transmission AG, via which the power present at the output shaft GW2 is distributed to driving wheels DW of the motor vehicle.

Modifications and variations can be made to the embodiments illustrated or described herein without departing from the scope and spirit of the invention as set forth in the appended claims.

| Reference characters | |
|---|---|
| G | transmission |
| GG | rotationally fixed component |
| P1 | first planetary gear set |
| E11 | first element of the first planetary gear set |
| E21 | second element of the first planetary gear set |
| E31 | third element of the first planetary gear set |
| P2 | second planetary gear set |
| E12 | first element of the second planetary gear set |
| E22 | second element of the second planetary gear set |
| E32 | third element of the second planetary gear set |
| P3 | third planetary gear set |
| E13 | first element of the third planetary gear set |
| E23 | second element of the third planetary gear set |
| E33 | third element of the third planetary gear set |
| B1 | first shift element |
| 03 | first shift element |

-continued

| Reference characters | |
|---|---|
| 06 | second shift element |
| 07 | third shift element |
| 14 | fourth shift element |
| 15 | fifth shift element |
| 57 | sixth shift element |
| 47 | seventh shift element |
| 67 | seventh shift element |
| V1 | first coupling |
| V2 | second coupling |
| 1 | first forward gear |
| 2 | second forward gear |
| 3 | third forward gear |
| 4.1 | fourth forward gear |
| 4.2 | fourth forward gear |
| 4.3 | fourth forward gear |
| 4.4 | fourth forward gear |
| 5 | fifth forward gear |
| 6 | sixth forward gear |
| 7 | seventh forward gear |
| 1b | first forward gear |
| 2b | second forward gear |
| 3b | third forward gear |
| 4b | fourth forward gear |
| 5.1b | fifth forward gear |
| 5.2b | fifth forward gear |
| 5.3b | fifth forward gear |
| 5.4b | fifth forward gear |
| 6.1b | sixth forward gear |
| 6.2b | sixth forward gear |
| 6.3b | sixth forward gear |
| 6.4b | sixth forward gear |
| 7b | seventh forward gear |
| 8b | eighth forward gear |
| E1 | first electrically drivable forward gear |
| E2 | second electrically drivable forward gear |
| E3 | third electrically drivable forward gear |
| E1b | first electrically drivable forward gear |
| E2b | second electrically drivable forward gear |
| E3b | third electrically drivable forward gear |
| E4b | fourth electrically drivable forward gear |
| E5b | fifth electrically drivable forward gear |
| ER | electrically drivable reverse gear |
| ER2 | electrically drivable reverse gear |
| ER3 | electrically drivable reverse gear |
| EDA1 | first superimposed operating mode |
| EDA2 | second superimposed operating mode |
| EDA3 | third superimposed operating mode |
| R1 | first reverse gear |
| R2 | second reverse gear |
| R3 | third reverse gear |
| GW1 | input shaft |
| GW1-A | external interface of the input shaft |
| GW2 | output shaft |
| GW2-A | external interface of the output shaft |
| EM | electric machine |
| S | stator |
| R | rotor |
| AN | connecting shaft |
| K0 | separating clutch |
| VKM | internal combustion engine |
| TS | torsional vibration damper |
| AG | axle transmission |
| DW | driving wheels |

The invention claimed is:

1. A transmission (G) for a motor vehicle, comprising:
an input shaft (GW1);
an output shaft (GW2);
first, second, and third planetary gear sets (P1, P2, P3); and
first, second, third, fourth, fifth, and sixth shift elements (03, 06, 07, 14, 15, 57),
wherein the planetary gear sets (P1, P2, P3) each comprise a first element (E11, E12, E13), a second element (E21, E22, E23), and a third element (E31, E32, E33), the first element (E11, E12, E13) of the respective planetary gear set (P1, P2, P3) is a sun gear, the second element (E21, E22, E23) of the respective planetary gear set (P1, P2, P3) is a carrier in the case of a minus gear set or a ring gear in the case of a plus gear set, the third element (E31, E32, E33) of the respective planetary gear set (P1, P2, P3) is the ring gear in the case of the minus gear set or the carrier in the case of the plus gear set,
wherein the output shaft (GW2) is permanently connected to the third element (E31) of the first planetary gear set (P1) and to the second element (E23) of the third planetary gear set (P3),
wherein the second element (E21) of the first planetary gear set (P1) is permanently connected to the third element (E32) of the second planetary gear set (P2),
wherein a first coupling (V1) is between the first element (E13) of the third planetary gear set (P3) and a rotationally fixed element (GG) of the transmission (G), a second coupling (V2) is between the second element (E22) of the second planetary gear set (P2) and the third element (E33) of the third planetary gear set (P3), one of the first coupling or the second coupling (V1, V2) is a rotationally fixed connection and the other of the first coupling or the second coupling (V1, V2) is a connection which is shiftable by the first shift element (03),
wherein the second element (E21) of the first planetary gear set (P1) is rotationally fixable by engaging the second shift element (06),
wherein the first element (E11) of the first planetary gear set (P1) is rotationally fixable by engaging the third shift element (07),
wherein the input shaft (GW1) is connectable to the second element (E22) of the second planetary gear set (P2) by engaging the fourth shift element (14),
wherein the input shaft (GW1) is connectable to the first element (E12) of the second planetary gear set (P2) by engaging the fifth shift element (15), and
wherein the first element (E12) of the second planetary gear set (P2) is connectable to the first element (E11) of the first planetary gear set (P1) by engaging the sixth shift element (57).

2. The transmission (G) of claim 1, wherein, by selective engagement of three of the six shift elements (03, 06, 07, 14, 15, 57), seven forward gears (1-7) are shiftable between the input shaft (GW1) and the output shaft (GW2), wherein:
the first forward gear (1) results by engaging the first shift element (03), the second shift element (06), and the fifth shift element (15) with the remaining shift element being disengaged;
the second forward gear (2) results by engaging the first shift element (03), the third shift element (07), and the fifth shift element (15) with the remaining shift element being disengaged;
the third forward gear (3) results by engaging the first shift element (03), the fifth shift element (15), and the sixth shift element (57) with the remaining shift element being disengaged;
the fourth forward gear (4.1, 4.2, 4.3, 4.4) results by engaging the first shift element (03), the fourth shift element (14), and another of the six shift elements (15, 06, 07, 57) with the remaining shift element being disengaged;
the fifth forward gear (5) results by engaging the fourth shift element (03), the fifth shift element (15), and the sixth shift element (57) with the remaining shift element being disengaged;

the sixth forward gear (6) results by engaging the third shift element (07), the fourth shift element (14), and the fifth shift element (15) with the remaining shift element being disengaged; and the seventh forward gear (7) results by engaging the third shift element (07), the fourth shift element (14), and the sixth shift element (57) with the remaining shift element being disengaged.

3. The transmission (G) of claim 1, wherein the second shift element (06) is a positive-locking shift element.

4. The transmission (G) of claim 1, wherein the fifth shift element (15) is a positive-locking shift element.

5. The transmission (G) of claim 1, wherein external interfaces (GW1-A, GW2-A) of the input shaft (GW1) and the output shaft (GW2) are arranged coaxial to each other and at opposite ends of the transmission (G), the third planetary gear set (P3) of the three planetary gear sets (P1, P2, P3) has the greatest axial separation from the external interface (GW1-A) of the input shaft (GW1).

6. The transmission (G) of claim 1, wherein external interfaces (GW1-A, GW2-A) of the input shaft (GW1) and the output shaft (GW2) are coaxial to each other, the third planetary gear set (P3) of the three planetary gear sets (P1, P2, P3) has the least axial separation from the external interface (GW1-A) of the input shaft (GW1).

7. The transmission (G) of claim 1, further comprising a seventh shift element (47/67), wherein the first element (E1*l*) of the first planetary gear set (P1) is connectable either to the second element (E22) of the second planetary gear set (P2) or to the second element (E21) of the first planetary gear set (P1) by engaging the seventh shift element (47/67).

8. The transmission (G) of claim 7, wherein by selective engagement of three of the seven shift elements (03, 06, 07, 14, 15, 57, 47/67), eight forward gears (1*b*-8*b*) are shiftable between the input shaft (GW1) and the output shaft (GW2), wherein:

the first forward gear (1*b*) results by engaging the first shift element (03), the second shift element (06), and the fifth shift element (15) with the remaining shift element being disengaged;

the second forward gear (2*b*) results by engaging the first shift element (03), the third shift element (07), and the fifth shift element (15) with the remaining shift element being disengaged;

the third forward gear (3*b*) results by engaging the first shift element (03), the fifth shift element (15), and the seventh shift element (47/67) with the remaining shift element being disengaged;

the fourth forward gear (4*b*) results by engaging the first shift element (03), the fifth shift element (15), and the sixth shift element (57) with the remaining shift element being disengaged;

the fifth forward gear (5.1*b*, 5.2*b*, 5.3*b*, 5.4*b*) results by engaging the first shift element (03), the fourth shift element (14), and yet another of the seven shift elements (15, 06, 07, 57, 47/67) with the remaining shift element being disengaged;

the sixth forward gear (6.1*b*, 6.2*b*, 6.3*b*, 6.4*b*) results by engaging three of the following shift elements: fourth shift element (14), fifth shift element (15), sixth shift element (57), seventh shift element (47/67) with the remaining shift element being disengaged;

the seventh forward gear (7*b*) results by engaging the third shift element (07), the fourth shift element (14), and the fifth shift element (15) with the remaining shift element being disengaged; and the eighth forward gear (8*b*) results by engaging the third shift element (07), the fourth shift element (14), and the sixth shift element (57) with the remaining shift element being disengaged.

9. The transmission (G) of claim 7, wherein a reverse gear (R1) between the input shaft (GW1) and the output shaft (GW2) is shiftable by engaging the second shift element (06), the fifth shift element (15), and the sixth shift element (57) with the remaining shift element being disengaged.

10. The transmission (G) of claim 9, wherein:

the first element (E11) of the first planetary gear set (P1) is connectable to the second element (E22) of the second planetary gear set (P2) by engaging the seventh shift element (47); and wherein, in addition or alternatively to the reverse gear (R1), a second reverse gear (R2) results by engaging the second shift element (06), the fifth shift element (15), and the seventh shift element (47) with the remaining shift element being disengaged, and/or a third reverse gear (R3) results by engaging the third shift element (07), the fifth shift element (15), and the seventh shift element (47) with the remaining shift element being disengaged.

11. The transmission (G) of claim 1, further comprising an electric motor (EM) including a stator (S) and a rotor (R), wherein the rotor (R) is permanently connected either to the input shaft (GW1) or to the first element (E12) of the second planetary gear set (P2).

12. The transmission (G) of claim 11, wherein the transmission (G) comprises a connecting shaft (AN), the connecting shaft (AN) is connectable to the input shaft (GW1) via a separating clutch (K0).

13. The transmission (G) of claim 11, wherein:

the rotor (R) is permanently connected to the first element (E12) of the second planetary gear set (P2);

by selective engagement of two of the first to sixth shift elements (03, 06, 07, 14, 15, 57), three electrically drivable forward gears (E1-E3) are shiftable between the first element (E12) of the second planetary gear set (P2) and the output shaft (GW2);

the first electrically drivable forward gear (E1) results by engaging the first shift element (03) and the second shift element (06) with the remaining shift element being disengaged;

the second electrically drivable forward gear (E2) results by engaging the first shift element (03) and the third shift element (07), with the remaining shift element being disengaged; and the third electrically drivable forward gear (E3) results by engaging the first shift element (03) and the sixth shift element (57) with the remaining shift element being disengaged.

14. The transmission (G) as claimed in claim 11, wherein:

the rotor (R) is permanently connected to the first element (E12) of the second planetary gear set (P2);

by selective engagement of two of the first to seventh shift elements (03, 06, 07, 14, 15, 57, 47/67), five electrically drivable forward gears (E1*b*-E5*b*) are shiftable between the first element (E12) of the second planetary gear set (P2) and the output shaft (GW2);

the first electrically drivable forward gear (E1*b*) results by engaging the first shift element (03) and the second shift element (06) with the remaining shift element being disengaged;

the second electrically drivable forward gear (E2*b*) results by engaging the first shift element (03) and the third shift element (07) with the remaining shift element being disengaged;

the third electrically drivable forward gear (E3*b*) results by engaging the first shift element (03) and the seventh shift element (47/67) with the remaining shift element being disengaged;

the fourth electrically drivable forward gear (E4*b*) results by engaging the first shift element (03) and the sixth shift element (57) with the remaining shift element being disengaged; and the fifth electrically drivable forward gear (E5*b*) results by engaging the sixth shift element (57) and the seventh shift element (47/67), with the remaining shift element being disengaged.

15. A drive train for a motor vehicle, wherein:

the drive train comprises an internal combustion engine (VKM), the transmission (G) of claim 1, and an axle transmission (AG) connected to wheels (DW) of the hybrid vehicle;

the input shaft (GW1) of the transmission (G) is flexibly connected via a torsional vibration damper (TS) to the internal combustion engine (VKM) either directly or via the separating clutch (K0); and the output shaft (GW2) of the transmission (G) is operatively connected, in a driving manner, to the axle transmission (AG).

\* \* \* \* \*